United States Patent
Tsaliah et al.

(10) Patent No.: US 11,286,053 B2
(45) Date of Patent: *Mar. 29, 2022

(54) DAMAGE MITIGATING APPARATUS OPERABLE BY PRESSURIZED DEPLOYMENT OF A FABRIC

(71) Applicant: PARAZERO LTD., Kiryat Ono (IL)

(72) Inventors: Amir Tsaliah, Haifa (IL); Ran Krauss, Beer Sheva (IL); Eden Avraham Attias, Tel Aviv (IL)

(73) Assignee: PARAZERO LTD., Kiryat Ono (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/576,882

(22) Filed: Sep. 20, 2019

(65) Prior Publication Data

US 2020/0108939 A1    Apr. 9, 2020

Related U.S. Application Data

(63) Continuation-in-part of application No. 15/030,533, filed as application No. PCT/IL2014/050920 on Oct. 22, 2014, now Pat. No. 10,421,552.

(30) Foreign Application Priority Data

Oct. 24, 2013    (IL) .......................................... 229068

(51) Int. Cl.
  *B64D 17/80*    (2006.01)
  *B64C 39/02*    (2006.01)
  *B64D 17/72*    (2006.01)

(52) U.S. Cl.
  CPC ............ *B64D 17/80* (2013.01); *B64C 39/024* (2013.01); *B64C 2201/027* (2013.01);
  (Continued)

(58) Field of Classification Search
  CPC ...... B64D 17/62; B64D 17/72; B64D 17/725; B64D 17/76; B64D 17/80; A62B 1/00;
  (Continued)

(56) References Cited

U.S. PATENT DOCUMENTS 1,852,439 A    4/1932  Stone
2,953,333 A    9/1960  Stencel
  (Continued)

FOREIGN PATENT DOCUMENTS

CN    1517272 A    8/2004
CN    101767651 A    7/2010
  (Continued)

OTHER PUBLICATIONS

Search Report from European Patent Application No. 14 85 5086, completed Apr. 28, 2017.
  (Continued)

*Primary Examiner* — Brady W Frazier
(74) *Attorney, Agent, or Firm* — FisherBroyles, LLP; Robert Kinberg

(57) ABSTRACT

Damage mitigating apparatus comprises totally extending hollow tubes, and projectiles attached to undeployed fabric and formed with a tube-receivable rod. Pressurized gas which is generated upon triggering of a gas generator flows through the tubes to propel the projection and to cause performance of at damage mitigating operation. In one embodiment, a damage mitigating aerial vehicle comprises sensors for detecting flight related characteristics and a communication unit for commanding activation of parachute deploying apparatus and of a lift generator deactivation unit following determination of a flight failure. In one embodiment, an aerial vehicle transmits a critical failure alarm signal to an unmanned aircraft traffic management system (UTM) station following detection of to failure, and
  (Continued)

the UTM elation transmits a warning signal to neighboring aerial vehicles that are predicted to be in a vicinity of the descent path of the failed aerial vehicle to avoid collision with the failed aerial vehicle.

19 Claims, 24 Drawing Sheets

(52) U.S. Cl.
CPC .. *B64C 2201/146* (2013.01); *B64C 2201/185* (2013.01); *B64D 17/72* (2013.01)

(58) Field of Classification Search
CPC ............ B64C 39/024; B64C 2201/027; B64C 2201/146; B64C 2201/185
USPC ........................................................ 244/149
See application file for complete search history.

(56) References Cited

U.S. PATENT DOCUMENTS

| | | | |
|---|---|---|---|
| 3,133,718 A | 5/1964 | Stencel | |
| 3,281,098 A | 10/1966 | Stencel | |
| 3,423,054 A | 1/1969 | Stencel | |
| 3,447,769 A | 6/1969 | Stencel | |
| 3,638,287 A | 2/1972 | Wright et al. | |
| 3,759,469 A | 9/1973 | Nimylowycz | |
| 3,926,391 A | 12/1975 | Nordine | |
| 4,105,173 A | 8/1978 | Bucker | |
| 4,257,568 A | 3/1981 | Bucker | |
| 5,169,093 A | 12/1992 | Schoffl | |
| 5,409,187 A | 4/1995 | Dunham | |
| 5,516,903 A | 5/1996 | Singh et al. | |
| 6,626,077 B1 * | 9/2003 | Gilbert | F41H 13/0006 102/400 |
| 7,607,488 B2 * | 10/2009 | Durham | A62C 99/0018 169/42 |
| 10,059,459 B2 | 8/2018 | Clark | |
| 2015/0314881 A1 * | 11/2015 | Tsaliah | B64D 17/725 244/146 |
| 2019/0176987 A1 * | 6/2019 | Beecham | B64C 39/024 |

FOREIGN PATENT DOCUMENTS

| | | |
|---|---|---|
| EP | 336910 A1 | 10/1989 |
| EP | 1160159 A1 | 12/2001 |
| EP | 0716015 B1 | 8/2002 |
| KR | 101496892 B1 | 3/2015 |
| KR | 20190106848 A | 9/2019 |
| WO | 2005/012086 A2 | 2/2005 |
| WO | 2013123944 A1 | 8/2013 |
| WO | 2015059703 A1 | 4/2015 |

OTHER PUBLICATIONS

International Search Report for PCT/IL2014/050920, dated Jan. 25, 2015.
Written Opinion for PCT/IL2014/050920, dated Jan. 25, 2015.
Chinese Office Action, dated Dec. 22, 2016, in related CN Appln. No. 201480058600.1, and English translation thereof.
International Search Report in related International Patent Application No. PCT/IL2020/051015, dated Dec. 29, 2020, 4 pages.
European Office Action in related European Patent Application No. 14855086.6, dated Apr. 28, 2021, 7 pages.

* cited by examiner

DAMAGE MITIGATING APPARATUS OPERABLE BY PRESSURIZED DEPLOYMENT OF A FABRIC

This application is a continual-in-part of U.S. patent application Ser. No. 15/030,538 filed Apr. 19, 2016 and entitled "APPARATUS AND METHOD FOR RAPID DEPLOYMENT OF A PARACHUTE" now U.S. Pat. No. 10,421,552, which is a national phase application of International Patent Application No. PCT/IL2014/050920 filed Oct. 22, 2014 and entitled "APPARATUS AND METHOD FOR RAPID DEPLOYMENT OF A PARACHUTE", which claims priority from Israeli Patent Application No. 229068 filed Oct. 24, 2013 and entitled "APPARATUS AND METHOD FOR RAPID DEPLOYMENT OF A PARACHUTE".

FIELD OF THE INVENTION

The present invention relates to the field of unmanned aerial vehicles (UAVs). More particularly, the invention relates to a UAV, together with a cooperating system, which is configured to mitigate damage to bystanders and to neighboring UAVs when subject to a failure.

BACKGROUND OF THE INVENTION

The use of UAVs in low-altitude airspace, for example lower than 150 m, to perform various civilian missions such as the delivery of goods, agricultural monitoring and rescue operations has significantly increased in recent years. Although each UAV is directed along a unique flight path to avoid colliding with a neighboring UAV, no provisions are made to mitigate damage to bystanders and to neighboring UAVs when the UAV is experiencing an unanticipated failure that causes the UAV to be suddenly diverted from its flight path.

The deployment of a parachute according to prior art methods involves several steps, including a triggering action initiated by an operator or a user which causes the parachute canopy to be longitudinally extracted from the compartment in which it is stored, and a passive inflation process characterized by an influx of ambient air into the canopy which causes the latter to expand until achieving the desired canopy diameter. The canopy expansion is generally resisted by structural tension of the canopy fabric and by inertia, taking on the order of at least $\delta$ seconds until fully expanded. Such a delay corresponds to a significant drop of tens of meters.

It would be desirable to provide apparatus by which a parachute could be rapidly deployed.

Some prior art apparatus is known for rapidly deploying a parachute, such as EP 336810, U.S. Pat. Nos. 4,257,568, 5,516,903, and CN 101767651. However, the time needed for fully deploying such prior art apparatus until the canopy is sufficiently inflated and expanded is excessive, precluding the use thereof for parachuting from a relatively low story of a building. Also, the prior art apparatus is either heavy, complicated to deploy or expensive, and is therefore not suitable for large scale use during a catastrophic event.

It is an object of the present invention to provide means for mitigating damage to neighboring UAVs when a given UAV in flight is caused to be diverted from its flight path after experiencing aw unanticipated failure.

It is an additional object of the present invention to provide means for mitigating damage to bystanders when a given UAV in flight is caused to be diverted from its flight path after experiencing an unanticipated failure.

It is an additional object of the present invention to provide an apparatus and method for deploying a parachute or other fabrics at a significantly more rapid rate than what is achievable by prior art methods.

It is yet an additional object of the present invention to provide apparatus for rapidly and reliably deploying a parachute or other fabrics that is light, of simple construction, and inexpensive.

Other objects and advantages of the invention will become apparent as the description proceeds.

A damage mitigating aerial vehicle comprises an aerial vehicle body configured with at least one rotor: parachute deploying apparatus interactable with an undeployed parachute which is retained in a chamber attached to said aerial vehicle body; a controller of drive means for said at least one rotor; a rotor deactivation unit in electrical communication with said controller; one or more aerial vehicle mounted sensors which are configured to detect flight related characteristics for said aerial vehicle; and a communication unit in electrical communication with said parachute deploying apparatus and with said controller of the rotor drive means, said communication unit comprising a failure detection unit which is responsive to said detected flight related characteristics to determine when said detected flight related characteristics are indicative of a flight failure, wherein said communication unit is operable to command activation of said parachute deploying apparatus and said rotor deactivation unit following determination of the flight failure, wherein deactivation of each of said at least one rotor by said rotor deactivation unit ensures that the parachute that is being expanded by said parachute deploying apparatus will not become entangled with rotating rotor associated blades.

An aerial vehicle based damage avoidance system comprises a plurality of aerial vehicles living in an airspace; and an unmanned aircraft traffic management system (UTM) station in data communication with said plurality of aerial vehicles, wherein each of said aerial vehicles comprises one or more on-board sensors including a location detector which are configured to detect flight related characteristics, a processing unit configured to process outputs of each of the on-board sensors and to detect a critical failure, a remote communication unit configured to transmit an instantaneous location identifier to said UTM station and to generate and transmit an aerial vehicle specific critical failure alarm signal to said UTM station following detection of the critical failure, and an activation unit configured to activate a flight generator deactivation unit and a parachute deployment apparatus following detection of the critical failure to initiate a descent operation along a descent path, wherein said UTM station is configured to transmit a warning signal to neighboring aerial vehicles that are predicted to be in a vicinity of the descent path of the failed aerial vehicle which is indicative that each of said neighboring aerial vehicles is to urgently change its flight path to avoid collision with the failed aerial vehicle.

Damage mitigating apparatus comprises a chamber in which an undeployed damage mitigating fabric is retained and secured to a platform; a manifold positioned within an interior of, and fixed to, said chamber, with said manifold is releasably coupled a single vessel within which pressurized gas is generated; a gas generator winch cooperates with said vessel; a plurality of hollow tubes which extend distally from, and are in fluid communication with, said manifold; and a plurality of projectiles, each of which is attached to a corresponding portion of said undeployed fabric and formed with a rod that is receivable in a corresponding one of said tubes, wherein the pressurized gas which is generated upon triggering of said gas generator is flowable through each of said tubes to propel said plurality of projectiles and to cause said fabric to become deployed, wherein said apparatus is configured to cause said fabric to achieve a desired expanded dimension simultaneously with ejection of said plurality of projectiles from said chamber and to perform a damage mitigating operation.

As referred to herein, directional terms such as "bottom", "top" and "upper" are described with respect to an orientation of the apparatus whereby the tubes extend upwardly from the manifold; however, the invention is also operable when the manifold is disposed at any other desired orientation.

The generated pressurized gas is dischargeable from an aperture formed in the vessel to an interior of the manifold and is flowable from said manifold interior through of each of the tubes simultaneously. Each of the projectiles is preferably propelled a predetermined distance by the pressurized gas.

In one aspect, the vessel contains a solid propellant consisting of materials that normally do not chemically react with each other and a pyrotechnic device for initiating a reaction with said propellant.

In one aspect the vessel contains a compressed or liquid gas and the gas generator is a spring loaded puncturing mechanism for generating pressurized gas upon puncturing the vessel.

In one aspect, the fabric is fully deployable within less than a second, e.g. within less than 0.3 sec, following a gas generator triggering event. By virtue of such a rapid parachute deploying operation, a user will be assured of being protected by the apparatus even when jumping from a low story of a building, for example 2D in above ground level.

In one aspect, each of the projectiles is sealingly engageable with a corresponding tube.

A method for performing a damage mitigating operation by rapidly deploying a fabric, comprising the steps of positioning a manifold, from which a plurality of hollow tubes extend distally, and are in fluid communication therewith, within an interior of a chamber directed to a target of a damage mitigating operation, wherein a single vessel within which presumed gas is generatable is releasably coupled with said manifold; introducing a rod terminating with a projectile into a corresponding one of said tubes and attaching said projectile to a corresponding peripheral portion of an undeployed fabric; storing said fabric within said chamber so as to be in a folded condition such that each folded portion of said fabric is separated without contact from another folded portion with the exception of an expandable crease therebetween; and performing a triggering action which causes presumed gas generated within the vessel to flow through said manifold to each of said plurality of hollow tubes and each of said projectiles to be distally propelled for a predetermined distance, whereby said fabric achieves a desired expanded dimension simultaneously with ejection of said fabric from said chamber.

DETAILED DESCRIPTION OF THE INVENTION

The present invention provides novel safety apparatus for an aerial vehicle, whether a manned aerial vehicle or an unmanned aerial vehicle (UAV), which mitigates damage to bystanders and to neighboring aerial vehicles when the given aerial vehicle is experiencing an unanticipated failure. Although the following description relates to a UAV, it will be appreciated that the invention is likewise applicable to a manned aerial vehicle mutatis mutandis.

The safety apparatus comprises a sensor-based, on-board failure detection unit that is capable of identifying a critical UAV failure and various devices, such as parachute deployment apparatus and communication equipment for transmitting distress or alarm signals, which are automatically activated in response to identification of the critical failure. The safety apparatus is operational independently of the conventional flight dependent systems for the UAV, one or more of which may be malfunctioned due to the critical failure.

The parachute deployment apparatus comprises propellable projectiles for rapidly deploying a parachute within a time period significantly less than a second, and even as less as 0.3 sec, to ensure a life saving parachute deployment operation when located at a relatively low altitude such as 20 m above ground level.

The safety apparatus is usable in conjunction with various types of UAV, such as a fixed-wing aircraft for carrying a relatively heavy payload while lift is generated by the forward airspeed provided by a propeller driven by an electric motor, and rotorcraft which generates lift by a set of rotors, including multirotor aircraft for example of four, six or eight rotors by which aircraft motion is controlled by varying the relative speed of each rotor, a helicopter comprising variable pitch rotors, and a gyrocopter that uses an unpowered rotor in free autorotation to develop lift while forward thrust is provided by an engine-driven propeller. Each of these rotors and propellers may be referred to as a "lift generator", and the motor or engine configured to drive the lift generator may be referred to as "drive means".

In other embodiments, the safety apparatus is secured to a fixed or movable platform to mitigate damage to property or to nearby humans.

Figure 1:
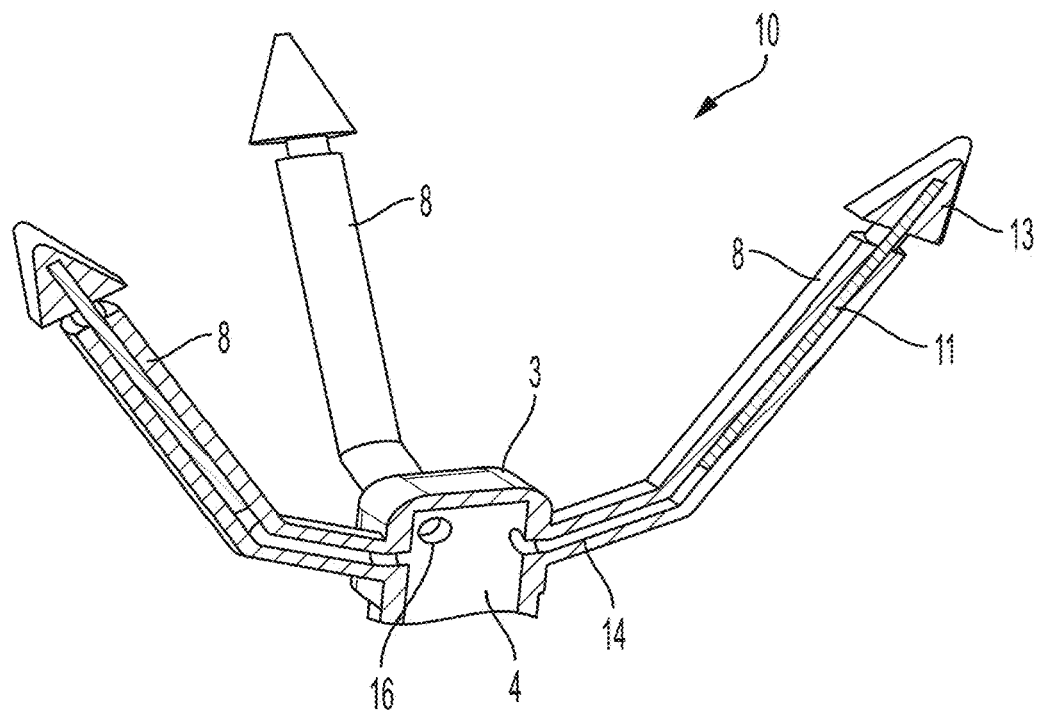
FIG. 1 is a perspective cross sectional view of a portion of parachute deploying apparatus, according to one embodiment of the present invention.

FIG. 1 illustrates apparatus 10, according to one embodiment of the present invention. Apparatus 10 comprises a substantially vertically disposed manifold 3 from which obliquely and upwardly extend a plurality of hollow tubes 8, e.g. three or four, in communication with the interior 4 of manifold 8 via a corresponding aperture 16 formed in the timer surface of the manifold. A rod 11 terminating with a larger surface projectile 13, e.g. with an arrow-shaped or tear-shaped head, is inserted into a corresponding tube 8. A draw cord is attached between each projectile 13 and a corresponding peripheral portion of the parachute canopy. These draw cords are in addition to the suspension lines that connect the canopy to the object to be parachuted, as well known to those skilled in the art.

Figure 13:
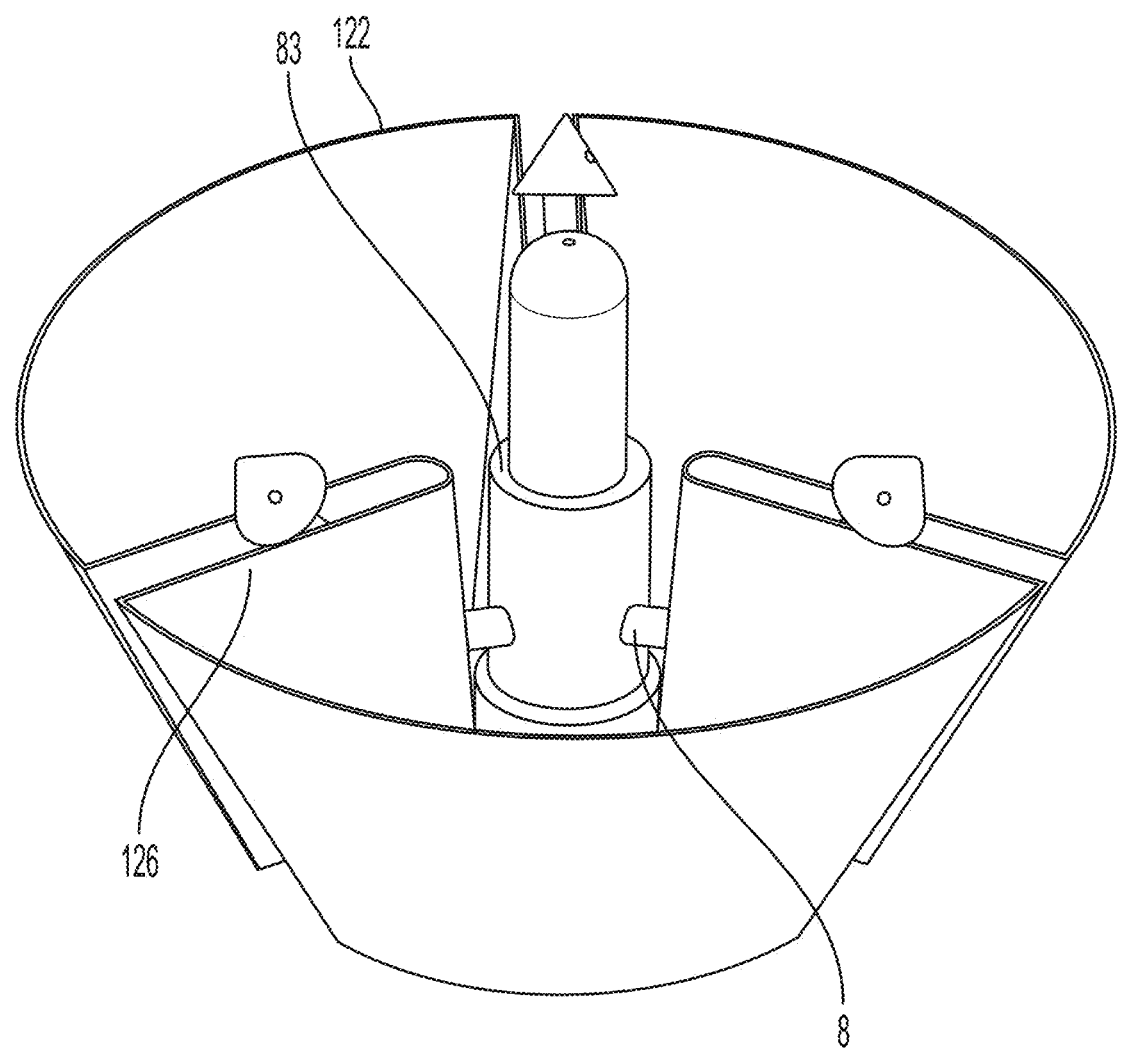
FIG. 13 is a perspective view of a chamber within which the apparatus of FIG. 8 is positioned and an undeployed parachute canopy is stored.

To prevent tearing, the canopy may be made of reinforced netting, for example Nylon 66 ripstop fabric. The undeployed parachute canopy is folded on top of manifold 3; and is retained in a chamber illustrated in FIG. 13.

Manifold 3 may have a rectangular vertical cross section as shown, or may be configured in other ways as well.

Tubes 8 are all oriented at the same angle, e.g. 80 degrees relative to a vertical plane, to ensure uniform opening of the parachute. An intermediate tube 14 of shorter length and oriented at a larger angle than the rod receiving tubes 8 may extend from manifold 8 to a corresponding tube 8.

Figure 2:
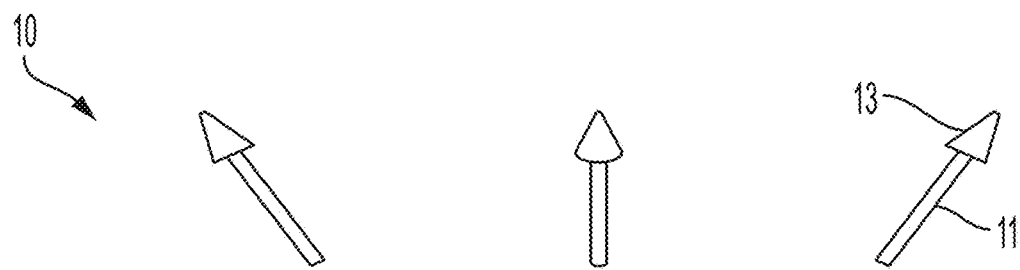
FIG. 2 is an exploded, perspective view of the parachute deploying apparatus of FIG. 1.
Figure 2:
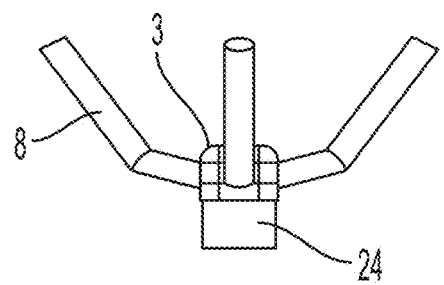
Figure 2:
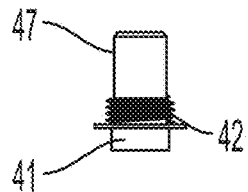

As shown in the exploded version of apparatus 10 in FIG. 2, a single, small sized pressure vessel 47 constituting a micro gas generator (MGG) is threadedly engageable, by external threading 42 formed in a bottom region of cylinder 41 which defines the vessel, with internal threading formed within cylinder 24 integral with, and extending downwardly from manifold 3. Projectile 13 is shown to be integrally formed with a corresponding rod 11. All components of apparatus 10 that are exposed to the generated gas, including manifold 3, tubes 8, rods 11 and projectiles 13 are made of heat resistant material. By employing a singly MGG that efficiently deploys a parachute, the weight and therefore the cost of the apparatus are significantly reduced with respect to the prior art.

Figure 3:
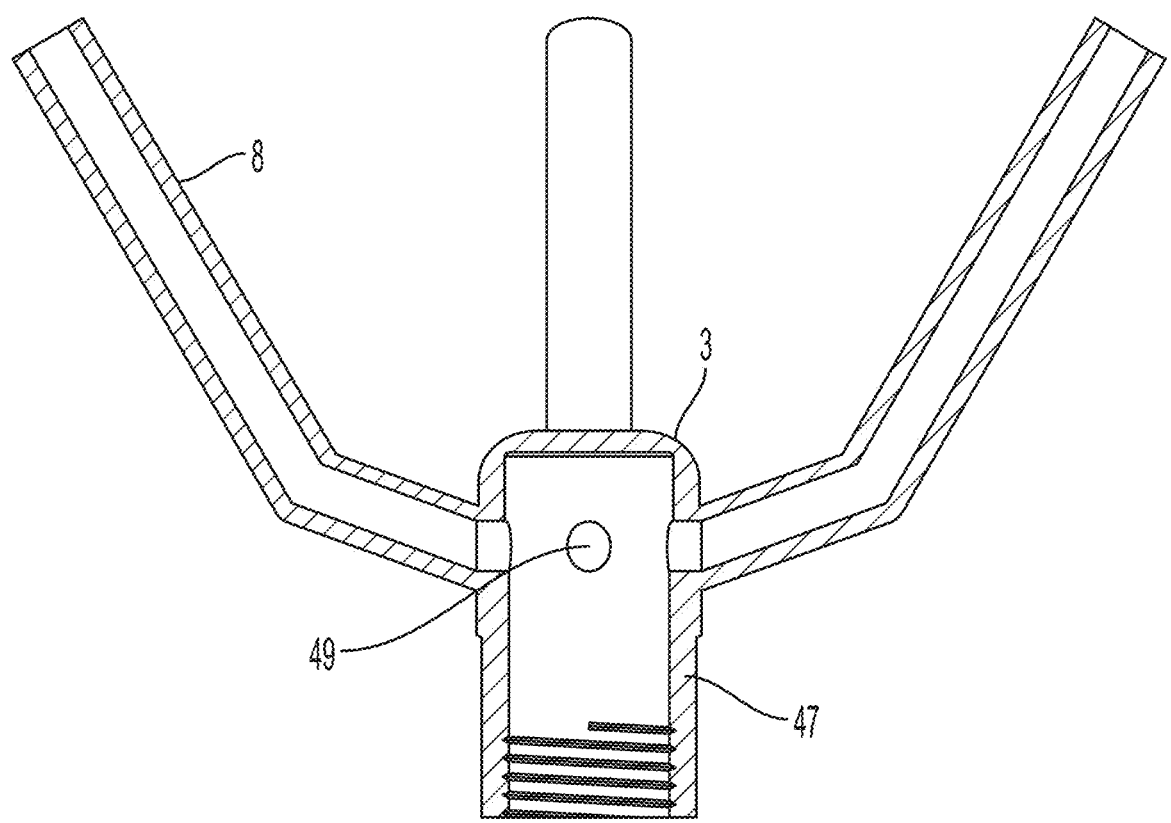
FIG. 3 is a vertical cross sectional view of a portion of the parachute deploying apparatus of FIG. 1, showing vessel comprising a gas generator coupled therewith.

As shown in FIG. 3, an aperture 49 is formed in an upper region of vessel 47, e.g. in its circumferential wall, through which the generated gas is dischargeable into the interior of manifold 3, when the vessel is fully received within the interior of the manifold, and then through the interior of each tube 8, in order to cause the projectiles to be propelled a predetermined distance.

Alternatively, pressure vessel 47 may be positioned on top of the manifold and the aperture through which the generated gas is dischargeable may be formed in a lower region of the vessel.

Figure 4:
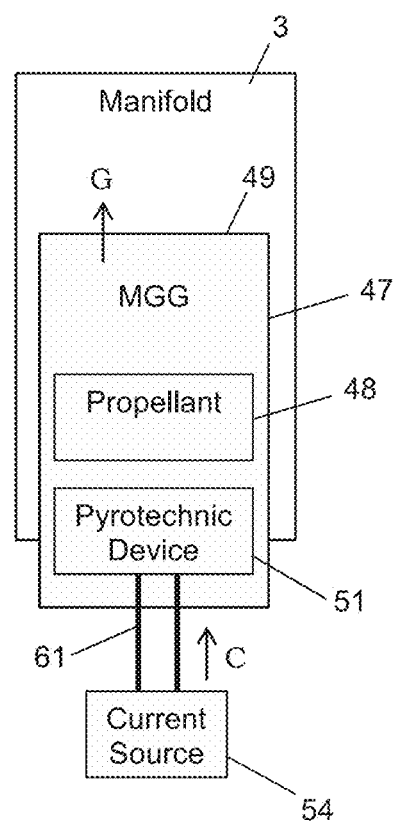
FIG. 4 is a schematic illustration of a parachute deploying event involving the vessel of FIG. 3.

Referring now to FIG. 4, vessel 47 contains a solid propellant 48 consisting of materials that normally do not chemically react with each other and a pyrotechnic device 51 for initiating a reaction with propellant 48.

The vessel 47 is of sufficiently small dimensions, e.g. having a diameter of 2 cm and a length of 7 cm, in order to be compactly retained in the manifold cylinder when not in use, yet is highly efficient in terms of its gas generating capability. A vessel 47 is replaceable upon conclusion of a parachute deployment operation.

Pyrotechnic device 51 may be activated by an electrical current source 54 for heating a conductor of the device above the ignition temperature of a combustible material in contact therewith. Ignition of the combustible material initiates the MGG, causing a rapid chemical reaction involving propellant 48 that generate a large volume of pressurized gas G, e.g. nitrogen, within the manifold interior. The materials of propellant 48 and the current and voltage supplied by electrical current source 84 may be selected so as cause a highly exothermic reaction.

Figure 5:
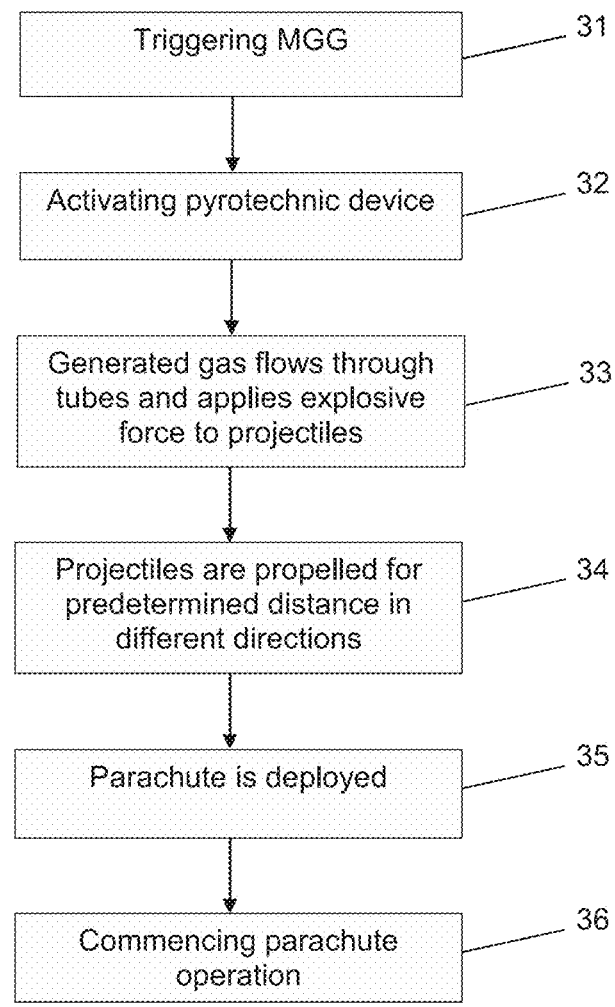
FIG. 5 is a method for deploying a parachute, according to one embodiment of the invention.

In one implementation as illustrated in FIG. 5, a user desiring to deploy a parachute according to the teachings of the present invention triggers the MGG in step 31 by electrical or mechanical means well known to those skilled in the art, which need not be described for purposes of brevity. As a result of the triggering operation, the pyrotechnic device becomes activated in step 32, causing the constituent components of the propellant to react and to generate energy intensive gas. The generated gas simultaneously flows through each tube extending from the manifold in step 33, applying an explosive force onto a corresponding projectile. The explosive force is converted into momentum, and each projectile is therefore propelled in a different direction for a predetermined distance in step 34. This distance, which is generally the sum of the length of the draw cord and the canopy radius, is reliably achieved by providing a sufficient dose of combustible material and a sufficient amount of activation current to cause the parachute to be deployed in step 35 by being expanded to the desired canopy diameter.

After being deployed, ambient air is received in the interior of the parachute, causing the latter to be retained in a buoyancy generating inflated condition. While the canopy is fully expanded, the projectiles remain attached thereto by a corresponding draw cord after having transferring their kinetic energy to the canopy to urge the latter to an expanded condition. The weight of each projectile, e.g. 23 gm is negligible with respect to the buoyancy force generated by the parachute, and therefore will not significantly impact the buoyancy of the parachute. A parachuting operation is then commenced in step 36.

In one embodiment the projectile head is sealed within the inclined tube. In this fashion, the gas pressure within the tube can be increased, to allow the projectile to be propelled a further distance.

It will be appreciated that the various components that are exposed to the generated gas need not be made of heat resistant material when other types of gas such as carbon dioxide or nitrogen are employed.

FIGS. 8-13 illustrate another embodiment of the invention whereby the pressurized gas is generated by means of a spring loaded puncturing mechanism for generating pressurized gas, e.g. carbon dioxide, on demand upon puncturing a vessel containing a compressed or liquid gas.

Figure 8:
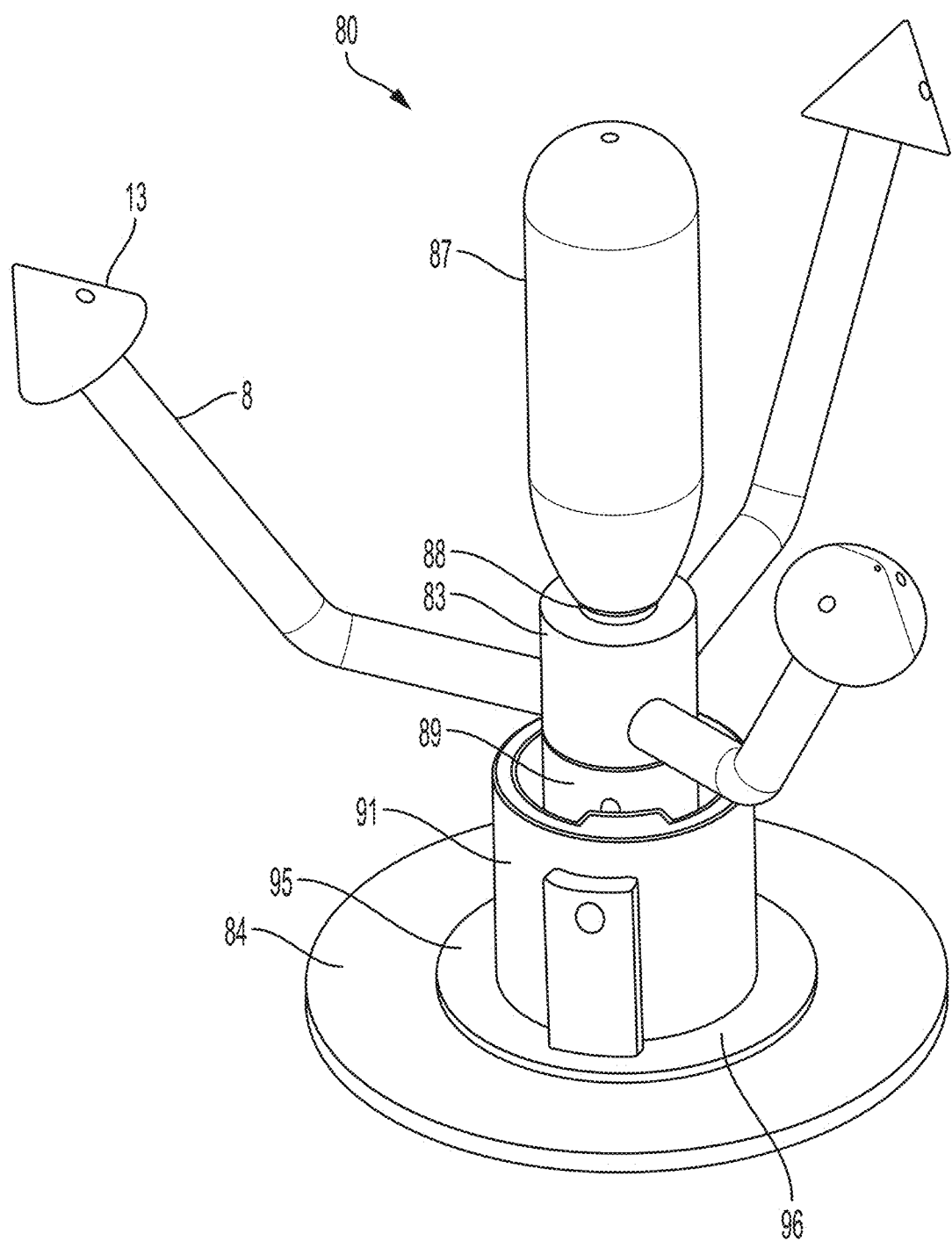
FIG. 8 is a perspective view of parachute deploying apparatus according to a another embodiment of the invention.

FIG. 8 illustrates an assembled, ready to trigger parachute deploying apparatus 80, which comprises manifold 83 having three inclined tubes 8 into each of which a corresponding arrow-headed projectile 13 is inserted, compressed gas vessel 87 releasably engaged with the top of manifold 83, hollow spying housing 89 threadedly engageable with manifold 83 and in which is housed a spring and hammer for driving the puncturing mechanism, an outer tubular rotatable element 91 for encircling spring housing 88 and for selectively releasing a vertically displaceable hammer, and a bottom circular plate 95 positioned above larger circular plate 84 and below rotatable element 91 which in formed with a groove 96 for limiting the angular displacement of element 91. At the mouth 88 of vessel 87 is formed a pierceable metallic diaphragm, generally near the threading of the vessel.

Figure 9:
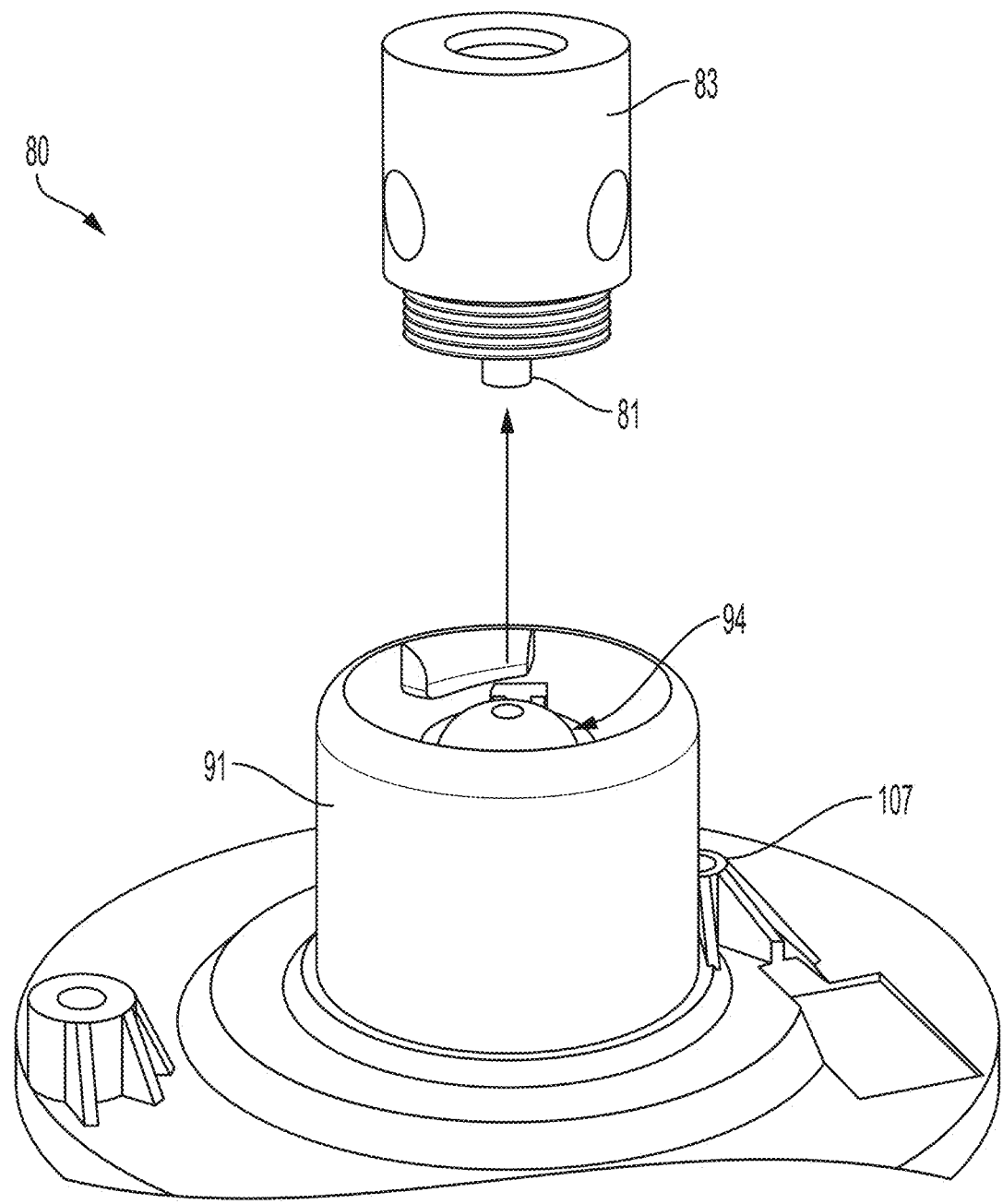
FIG. 9 is a schematic, perspective view of the apparatus of FIG. 8 when the spring housing is removed, showing a vertically displaceable hammer for initiating a gas generation event.

FIG. 9 schematically illustrates apparatus 80 when the spring housing is removed, showing hammer 94 positioned internally to rotatable element 91 and which is vertically displaceable on release of the spring force provided within the spring housing, at a sufficiently high speed to upwardly drive the bottom of pointed striking pin 81 so as to pierce the diaphragm and cause the liquid gas to change state in order to suitably propel the projectiles. Striking pin 81 is normally positioned within manifold 83 below the diaphragm of the gas generating vessel.

Figure 10:
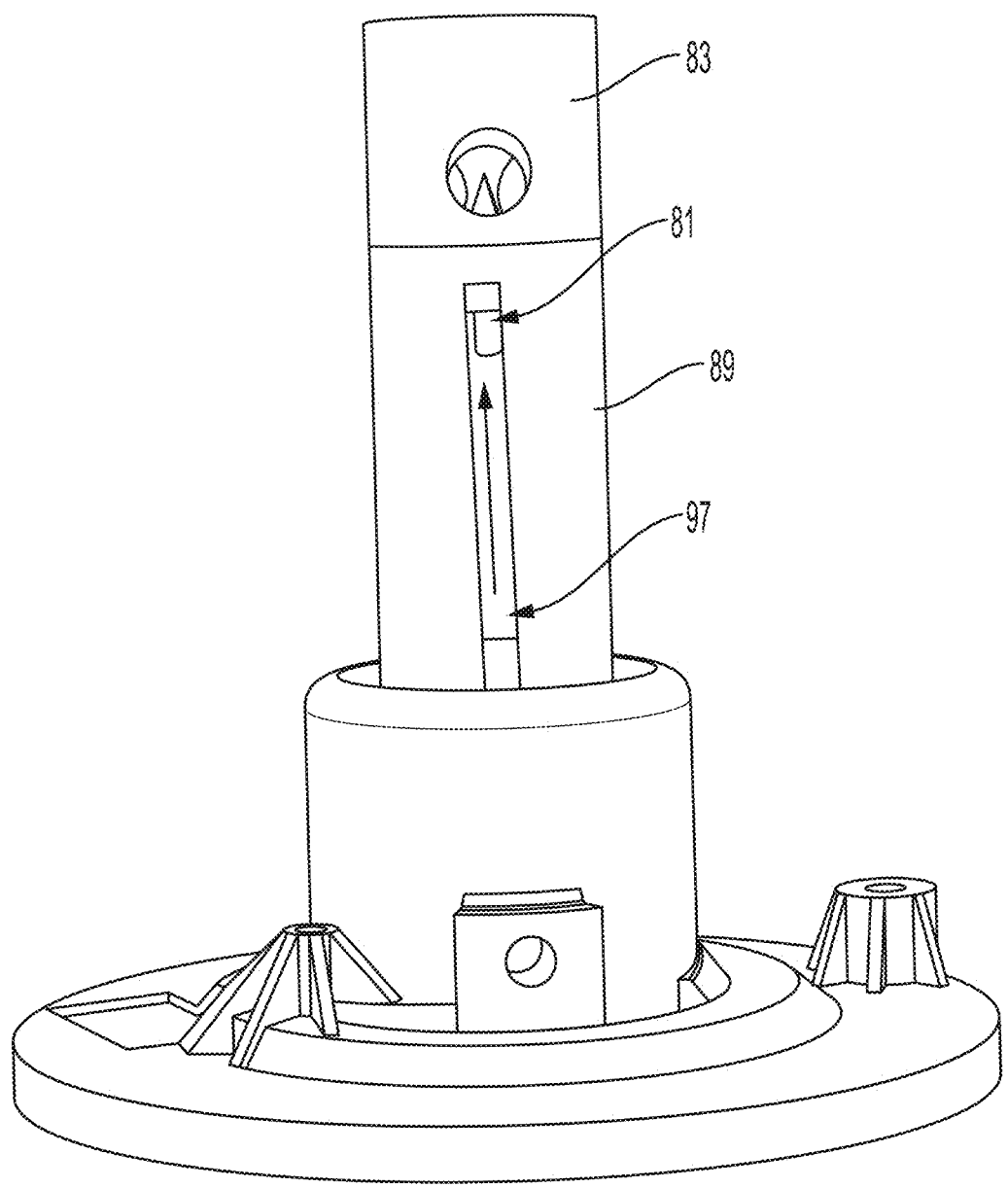
FIG. 10 is a side view of the apparatus of FIG. 8 when the hammer and manifold tubes are removed, showing the striking pin in a vertically displaced position.

FIG. 10 illustrates striking pin 81 after it has been upwardly driven. As shown, spring housing 89 is formed with two opposed vertical grooves 97 through each of which a corresponding arm of the hammer is able to pass.

Figure 11:
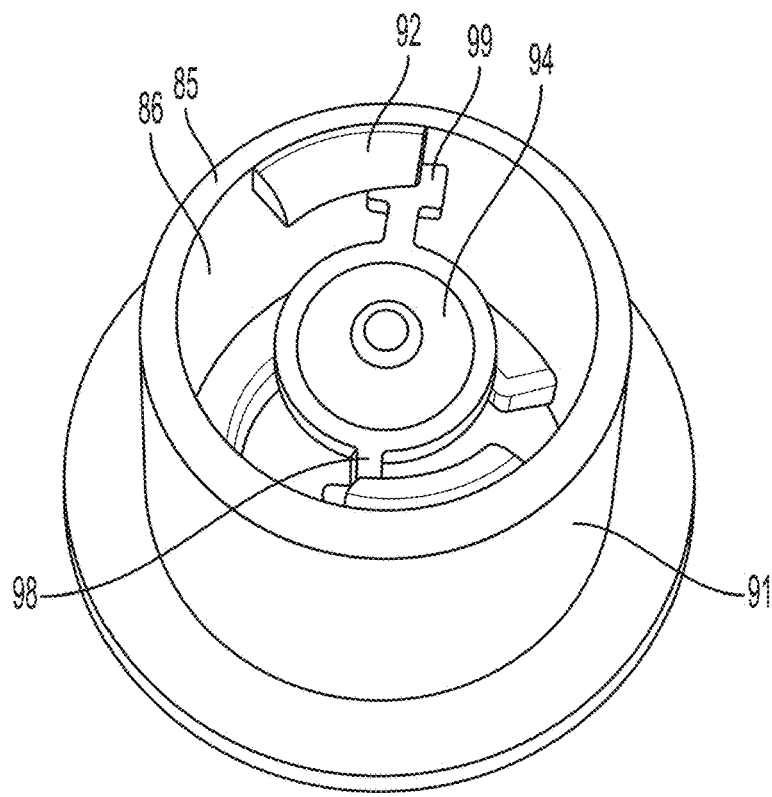
FIG. 11 is a perspective view from the top of the apparatus of FIG. 8 when the manifold and spring housing are removed, showing the hammer in a restrained position.

FIG. 11 illustrates the means for selectively releasing hammer 94. Rotatable element 91 has two opposed restrainers 92 circumferentially extending a limited distance along its inner face 86, adjacent to its rim 85. After the spring within the spring housing is tensed by an external tensioning device, as well known to those skilled in the art, hammer 94 is positioned such that the two protrusions 99 terminating at the end of a corresponding arm 98 which radially extends from the main central portion of the hammer are below a corresponding restrainer 92 and prevented from moving.

When mutable element 91 is circumferentially shifted, protrusions 99 become unrestrained, allowing hammer 94 to be vertically displaced.

Figure 12:
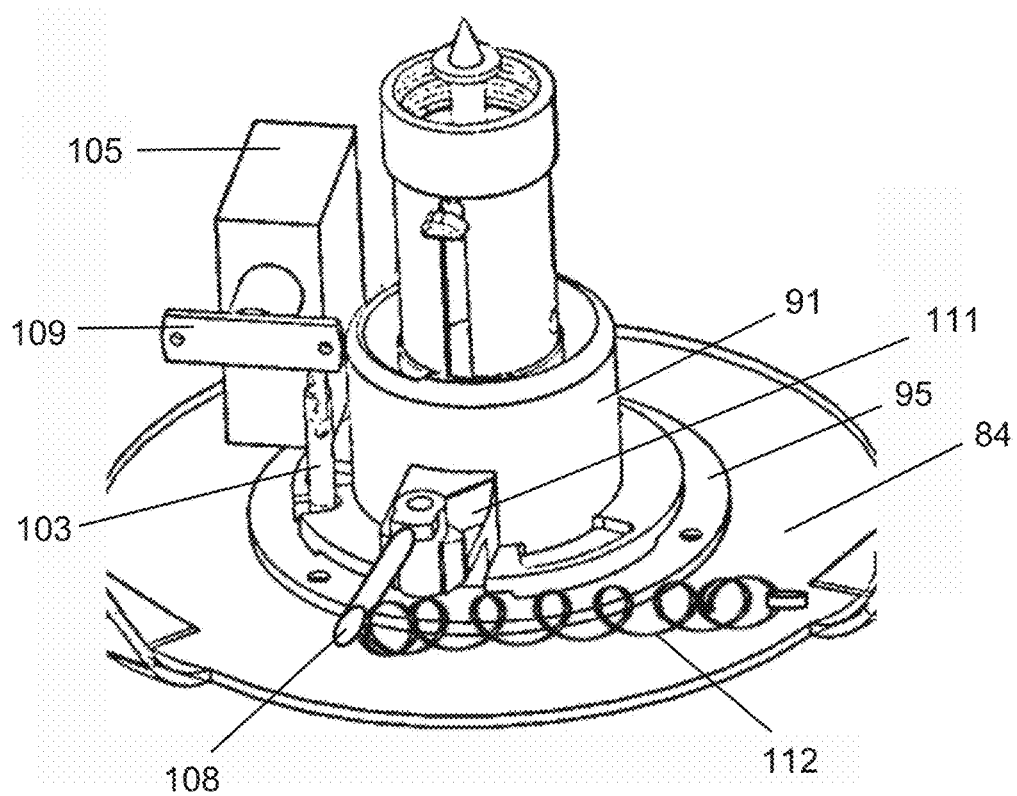
FIG. 12 is a perspective view of the apparatus of FIG. 8 when the manifold is removed, showing a disengaging unit for initiating rotation of a rotatable element.

FIG. 12 illustrates the disengaging unit for initiating rotation of rotatable element 91 and the resulting forceful vertical displacement of the hammer. External spring 112 is attached at one end to bottom plate 84 and at the other end to rod 108 horizontally extending from rotatable element 91, for example from block 111 attached to the outer wall of rotatable element 91. After upper plate 95 is rotated to extend external spring 112, vertically oriented pin 103 in releasable engagement with ring 107 (FIG. 9) protruding outwardly from rotatable element 91 is inserted within an aperture formed in plate 95, to secure rotatable element 91 while external spring 112 is tensed. Electrical motor 105, e.g. a servomotor, rotatably drives cam 109, when activated, to disengage pin 103 from plate 95 and to enable angular displacement of rotatable element 91 upon release of the spring force applied by external spring 112.

Figure 18:
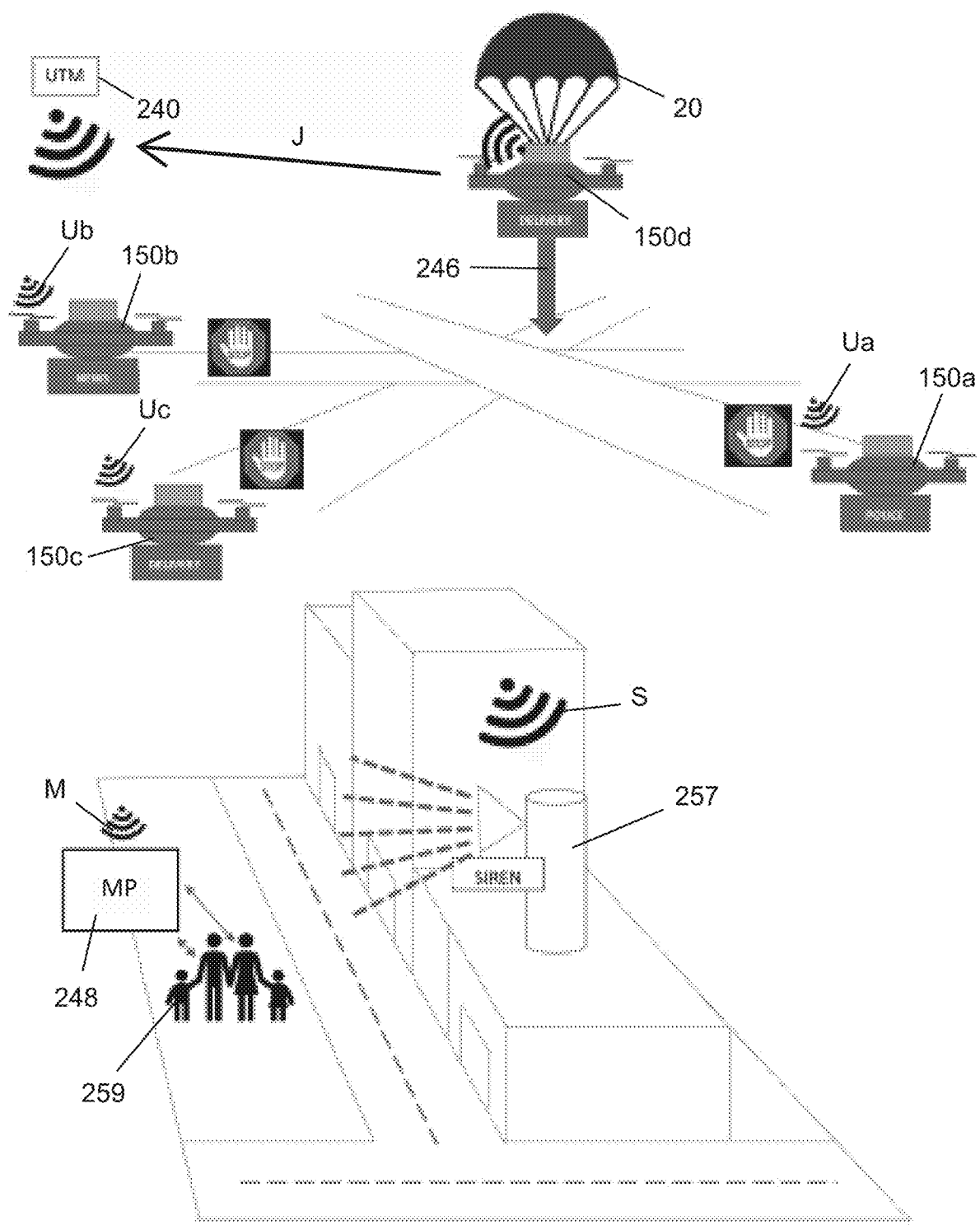
FIG. 18 is a schematic illustration of the means for avoiding a collision between a UAV flying along one of the different altitude flight paths of FIG. 17 and a failed UAV.

FIG. 18 illustrates circular chamber 122 in which the undeployed parachute is stored. Chamber 122 has a discontinuous wall winds is provided with a plurality of circumferentially spaced U-shaped portions 126 extending vertically along the entire height of chamber 122. Manifold 83 is positioned within the interior of chamber 122, internally to each of the U shaped portions 126. To facilitate positioning of each projectile rod 8 within the interior of a corresponding U-shaped portion 126 in preparation to be propelled, the internal wall of each U-shaped portion 126 facing manifold 83 may be formed with a bottom groove. Chamber 122 is connected to the object to be parachuted.

Alternatively, the puncturing mechanism is also operable when the compressed gas vessel is releasably engaged with the bottom of the manifold.

A parachute deployment operation may be initiated by a user who is entrapped within a skyscraper during a catastrophic event. As no other means of rescue is anticipated, the user mounts a harness to which is attached the apparatus of the present invention onto his upper torso. After the user jumps from an upper story, the MGG is triggered in midair while the projectiles are propelled behind, and rearwardly from, the user, allowing the parachute to be deployed within 0.3 sec following the triggering action due to the fast acting apparatus. This parachute deploying duration corresponds to a falling distance of only approximately 2 m. By virtue of the fast acting apparatus, a user will be assured of being protected even when jumping from a relatively low altitude such as 20 m above ground level, i.e. at a low story of a building. After descending to safety, the used vessel that generated the projectile propelling gas is replaced and the deployed parachute is folded in anticipation of another parachute deployment operation, if necessary.

It will be appreciated that a parachute deployment operation may be initiated in response to many other scenarios that require an object to be parachuted.

Alternatively, the parachute deploying apparatus may be provided on light aviation aircraft, including an unmanned aerial vehicle (UAV) and Personal Aerial Vehicle (PAV), regardless of shape, construction material and geometry.

Figure 6:
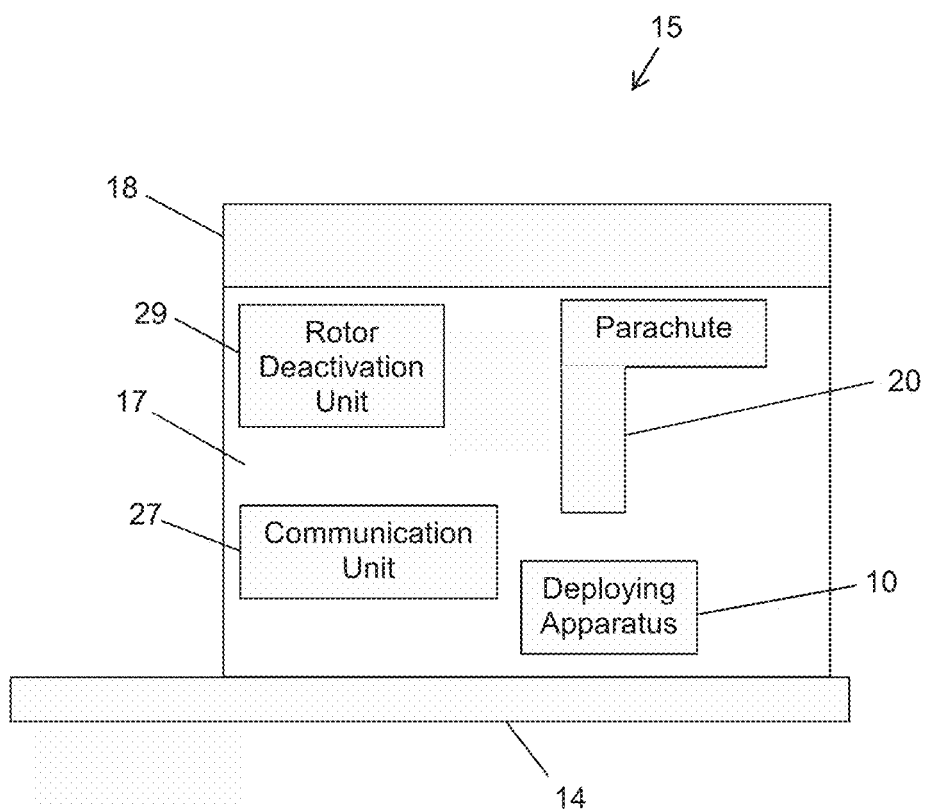
FIG. 6 is a block diagram of safety apparatus including an undeployed parachute assembly and the apparatus of FIG. 1.
Figure 7A:
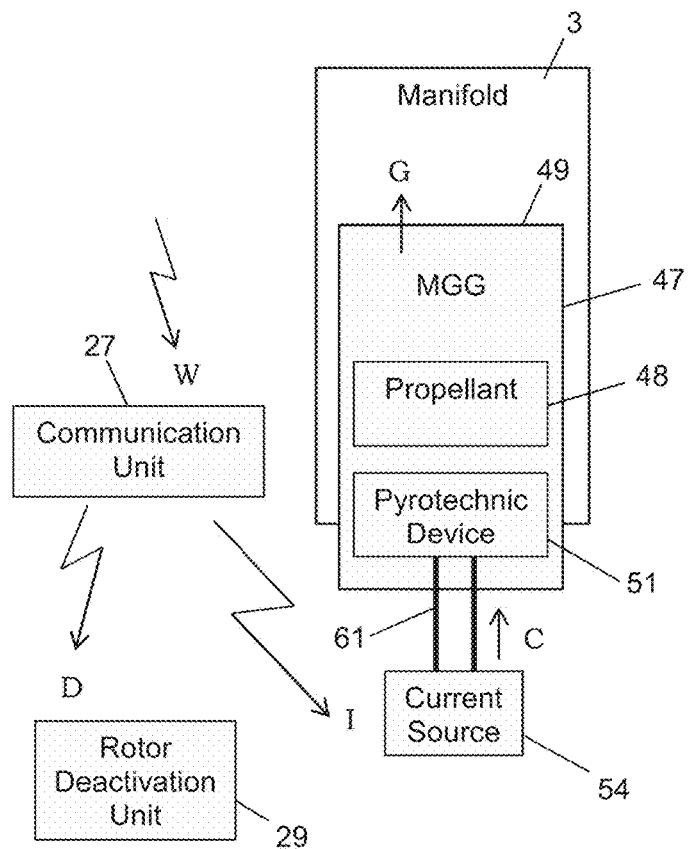
FIG. 7A is a schematic illustration of a parachute deploying event involving the safety apparatus of FIG. 6.
Figure 7B:
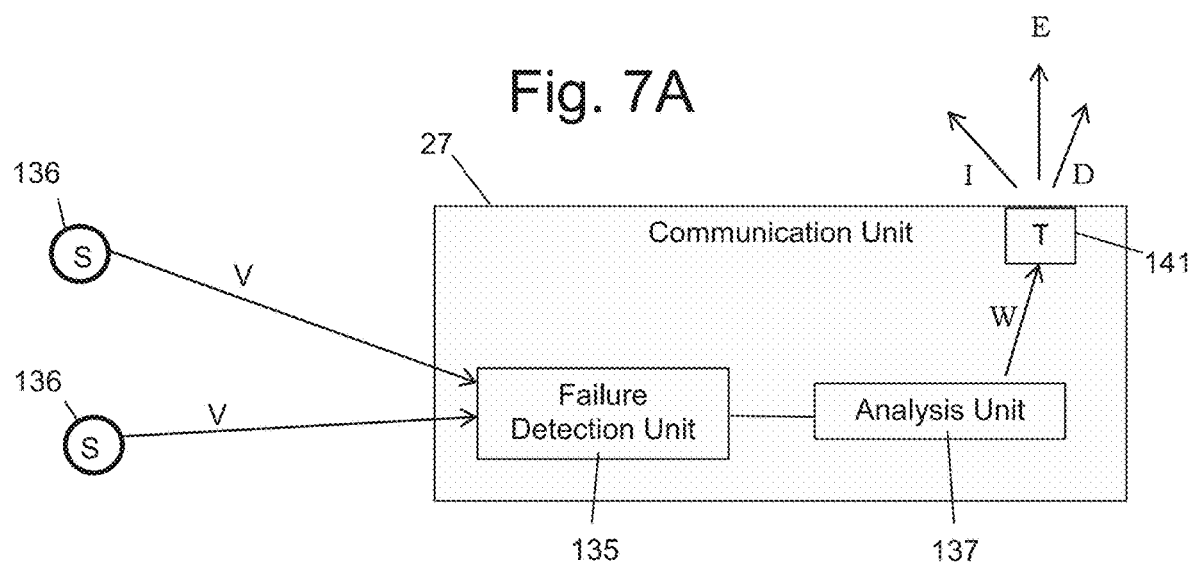
FIG. 7B is a schematic illustration of an on-board failure detection unit.

In this embodiment, as schematically illustrated in FIGS. 6 and 7A-B, safety apparatus 15 is retained within a chamber 17 attached to a support element 14 of the aircraft and has a detachable lid 18. Safety apparatus 15 may comprise expandable parachute assembly 20 shown in a folded condition, parachute deploying apparatus 10 for instantly deploying parachute assembly 20, e.g. made of Kevlar®, upon demand, a wireless communication unit 27 for remotely controlling operation of the safety apparatus, and a rotor deactivation unit 29 synchronized with parachute deploying apparatus 10 for preventing damage to the parachute when being expanded. Lid 18 becomes detached from chamber 17 when the parachute becomes sufficiently expanded so as to apply a force onto the lid.

An operator interacting with a remote flight controller may transmit a wireless duress indicating signal W to the transceiver of communication unit 27 upon detection that the UAV has been subjected to conditions of duress requiring deployment of the parachute. After receiving signal W, communication unit 27 transmits a deactivation signal D for operating rotor deactivation unit 29, which is in electrical communication with a controller 39 of the rotor drive means. Deactivation of the rotors will ensure that the expanding parachute will not become entangled with the routing blades. Simultaneously with the transmission of signal D, or shortly thereafter, communication unit 27 transmits an initiation signal I to current source 54, which in turn generates a suitable current C for activating pyrotechnic device 51. Current C flows to the pyrotechnic device 51 of vessel 47 via contacts 61 extending from the bottom end of the vessel. Activation of pyrotechnic device 51 causes the constituent components of propellant 48 to react and to generate gas G, which is discharged into manifold 3 in order to propel the plurality of projectiles.

The conditions of duress may be detected remotely by the operator in conjunction with a remote processor, or, alternatively, may be determined by an on-board failure detection unit 135, as shown in FIG. 7B. Failure detection unit 135 of communication unit 27 receives a signal V output from each on-board sensor 136, which is configured to detect a different UAV-associated flight related characteristic, and an analysis module 139 processes and analyzes all received signals V according to predetermined stored instructions. A wireless duress indicating signal W will be generated by analysis module 139 upon determination that the UAV has become subjected to a failure that requires termination of a current flight, whether a relative low-degree failure or a relative high-degree failure. A relative high-degree failure is generally uncorrectable and has a risk of being catastrophic and endangering nearby UAVs or bystanders, and therefore requires deployment of the parachute. The transceiver 141 of communication unit 27 transmits parachute deployment apparatus initiation signal I, rotor deactivation signal D, and an encrypted signal E transmittable to a remote station as will described hereinafter following generation of duress indicating signal W.

One way of distinguishing between a relative low-degree failure and a relative high-degree failure is by the amplitude of vibrations reflective of vibrations experienced by the UAV body during flight. Another way is by the magnitude of angular motion such as roll, pitch and yaw experienced by the UAV body during flight, which may be indicative of a mechanical failure, such as when a rotor arm is insufficiently tightened to the UAV body.

It will be appreciated that a remote processor accessible to the operator may also receive a signal V output from each on board sensor 136.

The fully deployed parachute will be able to intercept moving aircraft fragments, if any, and to sufficiently slow the descent of the disabled aircraft so as to minimize damage of a collision involving the aircraft.

The entire safety apparatus may weigh as little as 1-1.5 kg when the object to be parachuted is a human, or even less for lighter parachuted objects. For example, the safety apparatus may weigh 260 gm for a parachuted object weighing 3.5 kg or 450 gm for a parachuted object weighing 7 kg.

Figure 14:
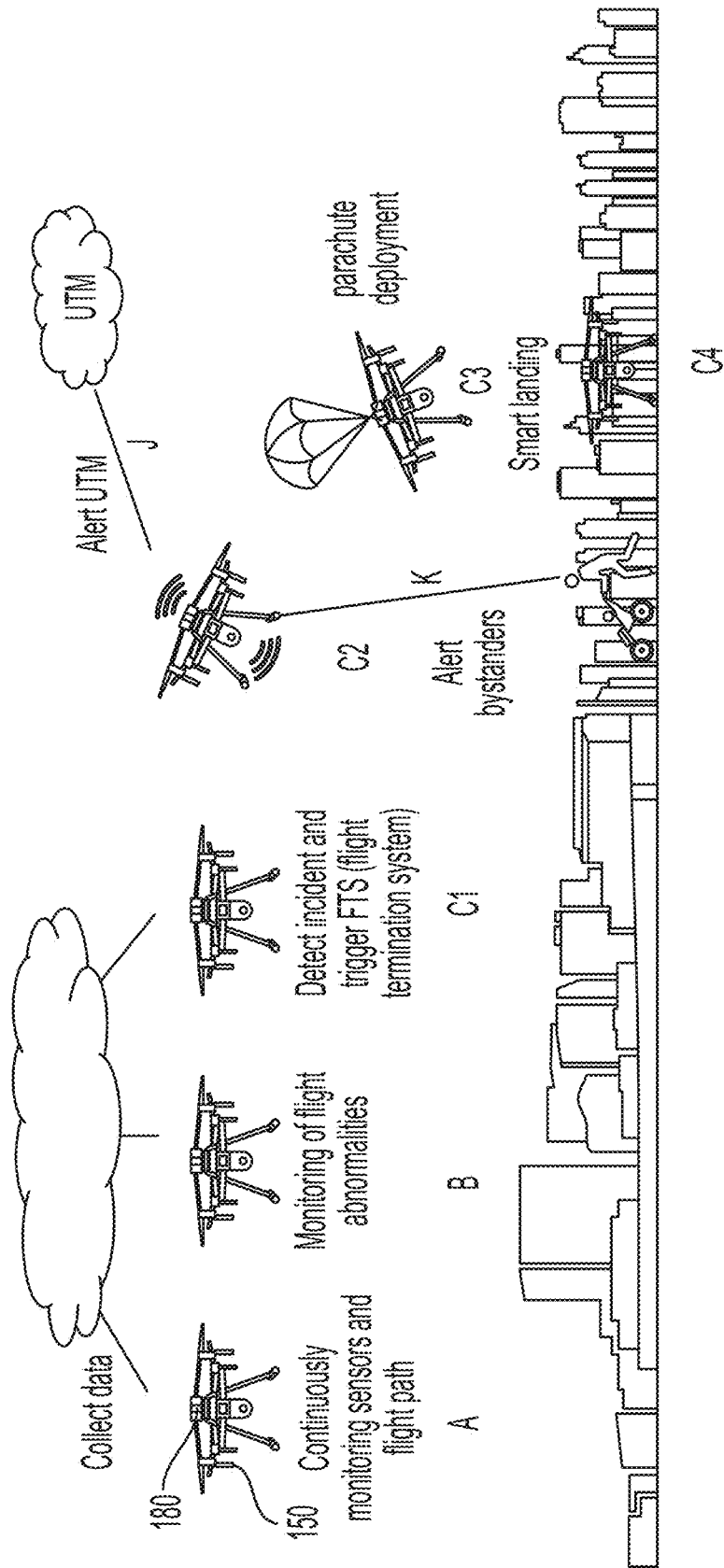
FIG. 14 is a schematic illustration of the operation of a UAV during different modes.

FIG. 14 schematically illustrates an exemplary UAV 150 equipped with safety apparatus 180 of the invention, when operating, autonomously or in conjunction with a remote operator, in one of the following three modes:

A. Monitoring mode—The failure detection unit monitors the signals output from each on-board sensor to determine whether they are representative of conditions of duress.

The sensors generally include an inertial measurement unit (IMU) having one or more of an accelerometer, gyroscope, and magnetometer to determine a current airborne orientation and acceleration of the UAV.

A predetermined flight path stored in a memory device of the failure direction unit is also monitored by receiving signals indicative of current UAV altitude which are output from a barometer, signals indicative of current UAV geographical location output from a GPS sensor, and signals indicative of current UAV speed output from an airspeed sensor.

Environmental sensors, such as an UV sensor temperature sensor and humidity sensor, may be used to estimate the deterioration of the UAV body for purposes of predictive maintenance.

Monitoring continuity of wireless communication with respect to the UAV is made possible by a serial communication unit.

B. Flight Abnormality mode—A flight abnormality, or a relative low-degree failure, is detected in this mode. When a relative low degree failure, such as a crack in a rotor blade, is detected in response to sensor readings, an updated flight path is transmitted to the memory device to force the UAV to fly to a specified ground station, to undergo a repair or maintenance operation.

The following is a non-limiting list of relative low-degree failures:
  a) deviation from a predetermined angular orientation;
  b) deviation from a predetermined change in angular orientation;
  c) deviation from predetermined translational or angular acceleration;
  d) deviation from predetermined altitude;
  e) deviation from predetermined flight path;
  f) predetermined drop in UAV battery voltage as determined by a voltage sensor; and
  g) loss in communication as evidenced by an inability to be properly guided.

C. Critical Failure mode—A critical, or relative high degree irreversible UAV failure is detected in this mode. A relative high-degree failure may be detected when the value of a sensor reading, or a combination of sensor readings, is significantly greater than a predetermined threshold relative to that which is indicative of a relative low-degree failure. Alternatively, the profile of a signal output, such as a predetermined spike, is uniquely characteristic of a relative high-degree failure.

In this mode, the UAV rotors or other flight generators are deactivated in step C1, a critical failure alert signal K is transmitted to an unmanned aircraft traffic management system (UTM) to make neighboring UAVs aware of the critical failure and an alert signal K is transmitted to bystanders in step C2 to prevent occurrence of a catastrophic event, the UAV equipped parachute is deployed as described hereinabove in step C3, and a smart landing procedure is performed, for example as described in copending WO 2018/173040 by the same Applicant, whereby a safety-ensuring processing unit is operable in conjunction with a downwardly facing collision avoidance system to calculate a required direction of descent in order to avoid a detected obstacle and to cause a sufficient number of airfoils to become circumferentially displaced, to cause the descending UAV to change its direction of descent in order to avoid the obstacle, for example autonomously, in step C4.

Safety apparatus 180 may be an add-on device, configured as one or more interconnected housings which are mounted on an existing UAV, in order to upgrade the existing UAV.

The failure detection unit may be provided at the bottom of the same housing in which the parachute deployment apparatus is retained.

Figure 15:
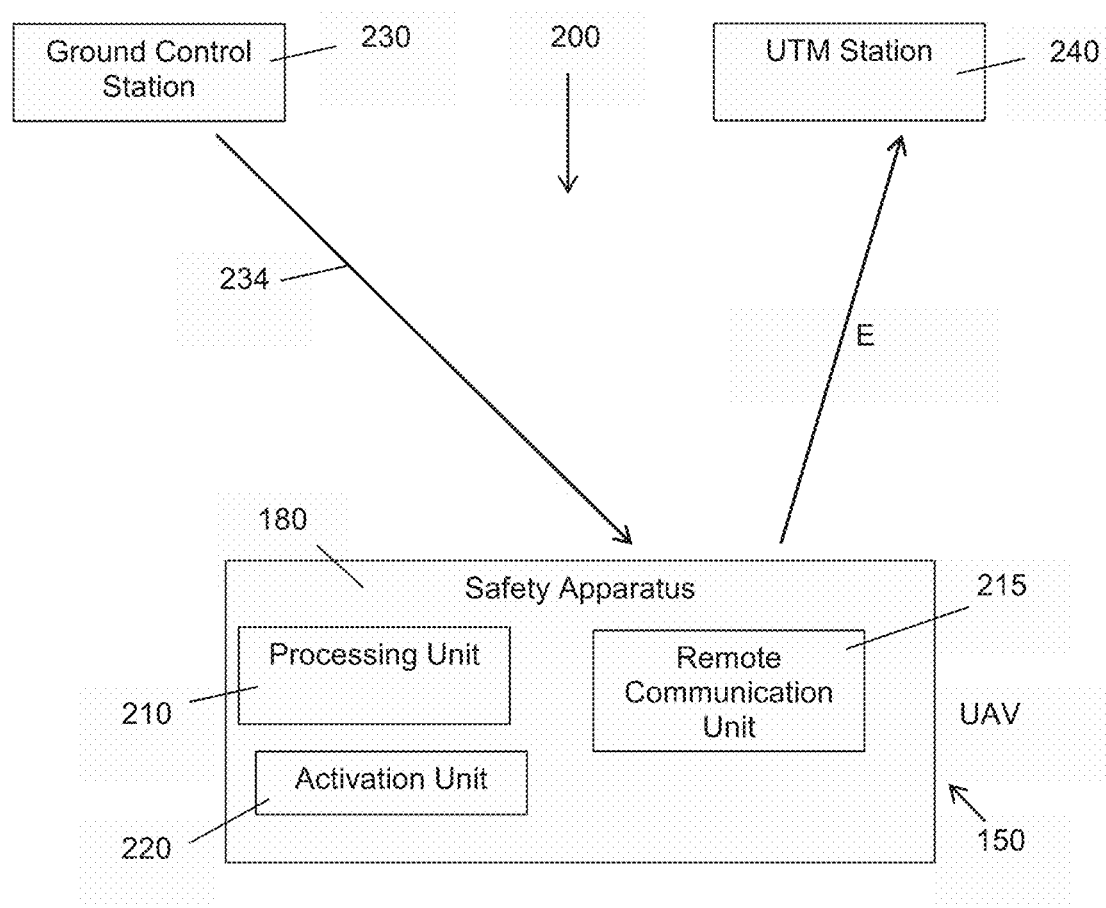
FIG. 15 is a schematic illustration of a UAV-based damage avoidance system.

FIG. 15 illustrates a UAV-based damage avoidance system 200. Although only one UAV 150 is shown, system 200 is configured to communicate with a plurality of UAVs 150 simultaneously.

System 200 is shown to comprise ground control station (GCS) 230, which is manned with one or more operators, usually interacting with a remote flight controller to generate a beacon 234, characterized by a broadband video and data link to control the flight path of a UAV 150. One operator may control more than one UAV.

It will be appreciated that system 200 is operable without GCS 230, when a UAV 150 operates autonomously.

Figure 17:
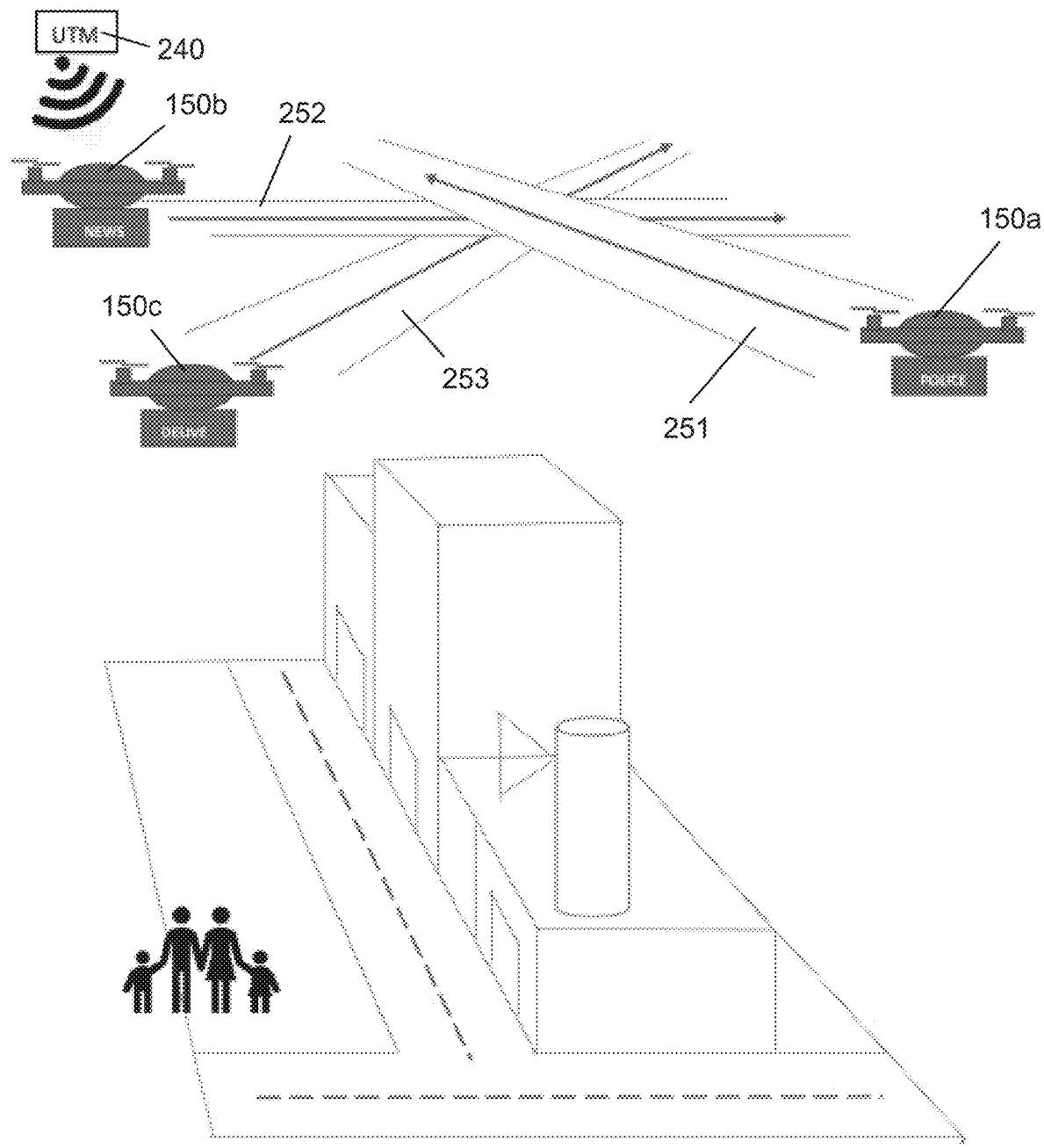
FIG. 17 is a schematic illustration of three UAV-specific different altitude flight paths generated by an UTM station.

A UTM station 240 is also shown. UTM station 240, which may be configured with a plurality of distributed sub-stations, comprises sophisticated communication and processing equipment that are configured to allocate low-altitude airspace to each of a plurality of UAVs 150, so that each can fly along a unique flight path. FIG. 17 schematically illustrates the generation of three different-altitude flight paths 251-3 by UTM station 240, along which UAVs 150*a-c*, respectively are authorized to fly. For example, UAV 150*a* may be a police UAV that allows law enforcement agents to observe an event from a different view, UAV 150*b* may be a UAV that is commissioned by a news agency, and UAV 150*c* may provide delivery services. The capabilities of UTM station 240 are advantageously enhanced by system 200, whereby it communicates with neighboring UAV as to the onset of a critical failure event involving one of the registered UAVs.

Safety apparatus 180 of UAV 150 is configured with three main units: (1) processing unit 210 for processing the on-board sensor outputs to determine the existence of a relative low-degree or high-degree failure, generally in conjunction with failure detection unit 135 and analysis unit 137 shown in FIG. 7B, (2) remote communication unit 215 for generating and transmitting an encrypted signal E provided with a UAV identifier to GCS 230, if in data communication therewith in order to transmit the data associated with the output from each on-board sensor, or to UTM station 240 so as to be indicative of a critical failure alarm signal, and (3) activation unit 220 for activating the flight generator deactivation unit, parachute deployment apparatus, warning devices for bystanders, and emergency landing equipment, if necessary.

As schematically illustrated in FIG. 18, immediately following detection of a relative high-degree failure, the UAV 150*d* experiencing the critical failure event (hereinafter the "failed UAV") transmits a critical failure alarm signal J to UTM station 240. The critical failure alarm signal J generally includes a current location and altitude of the failed UAV 150*d* as well as its planned descent path 246.

Since the failed UAV 150*d* commences a descending operation after having terminating its flight and deploying its parachute 20, the failed UAV is liable to pass through the airspace of UAVs flying at lower altitudes and cause a dangerous collision. To prevent such a dangerous occurrence, UTM station 240 transmits update signals Ua-c, each of which being representative of an UAC-specific updated flight path, simultaneously to all UAVs 150*a-c*, respectively, which are predicted to cross, or to be in the vicinity of e.g. within 5 meters, the descent path 246 of the failed UAV 150*d*, so that these neighboring UAVs 150*a-c* will fly away from the vicinity of the descent path. The failed UAV 150*d* may generate its descent path 246, which may be dynamic for example in response to visualized obstacles, following initiation of the parachute deploying operation and transmit the instantaneous descent path to UTM station 240.

When failed UAV 150*d* is a fixed-wing aircraft, parachute 20 may be deployed during the course of a descending operation as a fixed-wing aircraft is configured to glide following deactivation of each lift generator by the lift generator deactivation unit. The failed UAV 150*d* transmits the glide path to UTM station 240 to alert the neighboring UAVs 150*a-c*. When the failure detection unit detects a UAV acceleration that is greater than a predetermined value, e.g. $3.0$ m/s$^2$, which is indicative of the commencement of a free fall rather than of a gliding operation, a parachute deploying operation i then automatically initiated.

UTM station 240 is also adapted to alert bystanders 259 as to the approaching failed UAV. UTM station 240 is able to access the local cellular base station and to determine which mobile phones (MP) 248, such as smartphones, held by corresponding users are in the vicinity of the forecasted descent path 240 of failed UAV 150*d*, generally at ground level 243. An alert signal M is then transmitted to these mobiles phones 248 over the cellular network to allow the users to find immediate shelter. These users are generally afforded up to 10 seconds to find shelter since the descent rate of a parachuted UAV is on the order of 3-4 m/s and the UAV generally fly at an altitude of 50-100 m. An alert signal S may also be transmitted by UTM station 240 to the receiver of an on-ground siren 257, so that a loud warning sound will be immediately emitted thereby, to indicate to bystanders located in the vicinity of the descent path of failed UAV 150*d* that they must immediately significantly change their location or seek shelter.

Alternatively, UTM station 240 alerts the neighboring UAVs and each neighboring UAV generates its own updated flight path.

FIG. 18 schematically illustrates components of safety apparatus 180. Safety apparatus 180 need not comprise all of the illustrated components the number of types of components provided with safety apparatus 180 is dependent upon the desired implementation.

Processing unit 210 may comprise the following onboard sensors IMU 136*a*, barometer 136*b* magnetometer 136*c*. GPS sensor 136*d* for determining real-time UAV locations and for purpose of geo-fencing, UV sensor 136*a*, temperature sensor 136*f*, humidity sensor 135*g*, airspeed sensor 136*h*, and vision sensor 136*i* and LiDAR sensor 136*j* for use in conjunction with a smart landing procedure. The battery voltage may be determined through the aerial communication unit 216 of remote communication unit 215, or alternatively through a voltage sensor. If the battery voltage is low a backup power unit 207 that is independent of the UAV battery may be employed. All of these sensor outputs may be recorded in one or more loggers 208 that are protected in a black box-type arrangement. Some sensor outputs are processed by a CPU 211, and some are processed by an image processor 212.

In remote communication unit 215, wireless communication equipment 214 is used to establish a data link with the GCS or with the UTM station. Any time a data link is made, a UAV identifier stored in module 217 is included in the transmitted signal, which is encrypted by unit 218. Serial communication unit 216 is in communication with the UAV controller 201, i.e. autopilot, via bus 202 and with the UAV electronic speed controller (ESC) 203 via bus 204.

Activation unit 220 comprises safety module activation unit 221, generally configured with a rotor deactivation unit, or a deactivation unit for any other lift generator, and parachute deploying apparatus 226, or deploying apparatus for any other type of fabric used for a damage mitigating operation. Activation unit 220 may also comprise a hazard indicator activation unit 223 that includes warning devices 224 for bystanders, such as a strobe light and a buzzer. The strobe light is visible when the UAV is located at a significant height above ground level, e.g. 150 m, and the buzzer is audible when the UAV is located at a relatively low height above ground level, e.g. 50 m, yet the bystander is afforded sufficient time to be distanced from the descending UAV after sensing the alarm signal generated by a warning device 224 as the descent rate of the UAV under the influence of a deployed parachute is less than 5 m/s. Activation unit 220 may also comprise a smart landing mechanism 247 configured to perform emergency landing under the guidance of a smart landing controller 244, which may also command the deployment of an airbag 249 to reduce the impact with an existing surface during an emergency landing procedure.

In other implementations, the safety apparatus according to any embodiment described herein may be used not only for deploying a parachute, but also for deploying other damage mitigating fabric types that are retained in a chamber attached to the UAV body. For example, a net mesh made from a strong fiber such as Kevlar® or Dyneema®, when deployed, may be used to entrap a malicious UAV. Alternatively, a fire suppressing fabric, such as one made of Kevlar® and interspersed with fiberglass, may be deployed.

Figure 19:
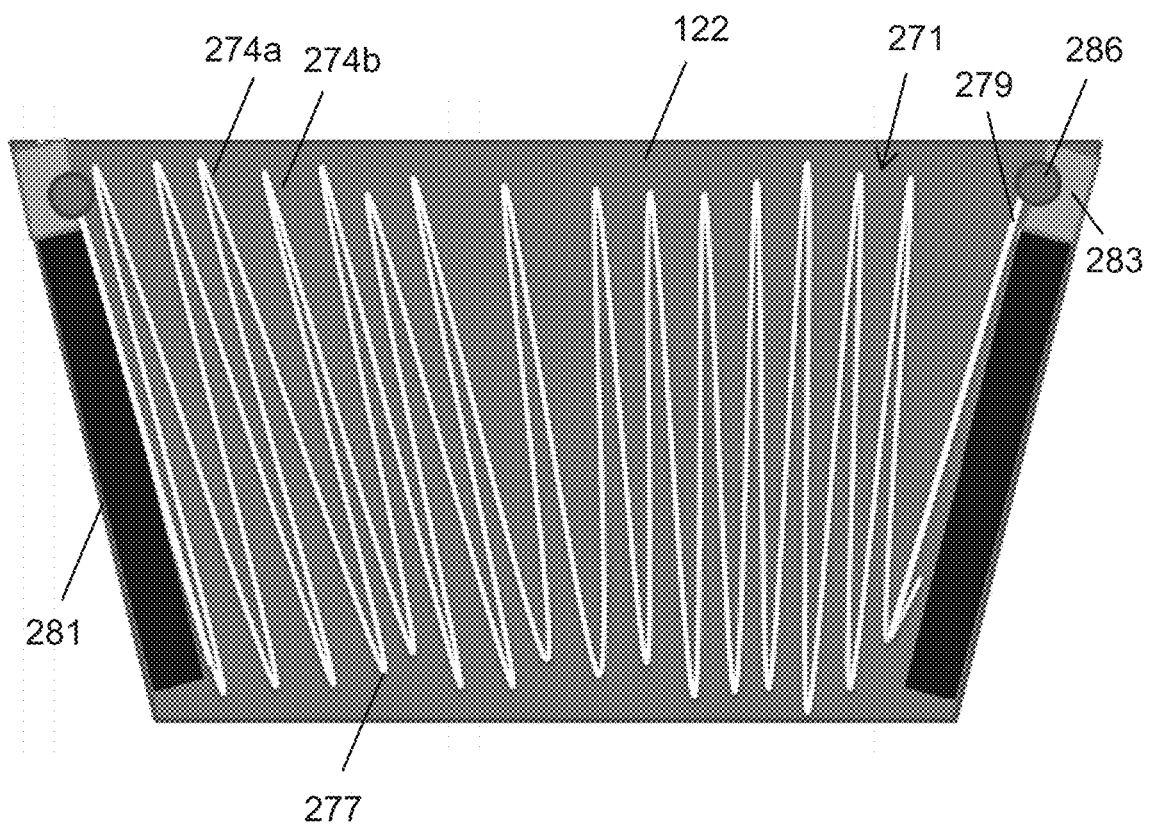
FIG. 19 is a cross sectional view of the chamber of FIG. 13, showing a fabric in a folded undeployed condition retained therewithin and attached to projectiles while each of the hollow tubes within each a corresponding projectile rod is receivable is removed.

As shown in FIG. 19, the fabric 271 is retained in a folded undeployed condition within chamber 122. Fabric 271 may be folded in the same way for any desired implementation of the safety apparatus. A group of folded portions 274 of fabric 271 is retained within chamber 122 between two adjacent U-shaped, or otherwise hollow, e.g. concave portions 126 of chamber 122 (FIG. 13), such that a first folded portion 274a is separated without contact from a second folded portion 274b adjacent to folded portion 274a, with the exception of an expandable crease 277 between folded portions 274a and 274b. Projectile rod 281 is insertable within an oblique tube that is secured within the interior of a corresponding portion 126, and a peripheral portion 279 of fabric 271 is attached by attachment means 286 to a corresponding projectile 283 at the distal end of rod 281.

The number of projectiles 283 employed is dependent upon the weight or size of fabric 271. For example, if fabric 271 has a weight of 500 g, four projectiles 283 that are circumferentially and evenly spaced around the periphery of circular chamber 122 by an angular spacing of 90 degrees and attached to a peripheral portion 279 of fabric 271 will be used to ensure an optimal uniform ejection of the fabric from chamber 122.

Although not shown, fabric 271 is continuous with other groups of folded portions each of which retained between a different pair of hollow portions 126. Chamber 122 may have any desired shapes for example circular or polygonal.

An exemplary folded condition is shown, such that second folded portion 274b is positioned to the side of first folded portion 274a, but it will be appreciate that any other suitable folded portion orientation and condition is within the scope of the invention, insofar as each folded portion 274 is able to be expanded uninhibitedly and rapidly upon ejection of the projectiles 283 from chamber 122.

Fabric 271 is able to achieve a desired expanded dimension simultaneously with ejection of the plurality of projectiles 283 from chamber 122 by virtue of a combination of the following factors: (a) a rapidly reacting gas generator, (b) the obliquely extending hollow tubes through which the generated gas flows applies an explosive force onto each projectile, causing each projectile to be propelled distally in a different direction by a distance designed to cause the fabric to become tensioned when expanded and to perform a desired damage mitigating action, and (c) the undeployed fabric is stored within the chamber in a folded condition such that each folded portion of the fabric, is separated without contact from another folded portion, allowing each folded portion to be expanded uninhibitedly and rapidly. For example, the fabric is fully deployable within less than a second, e.g. within less than 0.3 sec, following a gas generator triggering event initiated remotely by an operator or by other means, such as imaging means. The imaging means may be configured to identify a malicious UAV, or one that has intruded into an unauthorized flight zone, or to identify the presence of a fire, and to deploy fabric 271 once the initiating UAV provided with the safety apparatus and the imaging means is within deploying range of a target.

It will be appreciated that fabric 271 may also be satisfactorily expanded to perform a damage mitigating operation even when the hollow tubes through which the generated gas flows do not extend obliquely with respect to the manifold, but rather extend substantially parallel to the longitudinal axis of the manifold.

Figure 16:
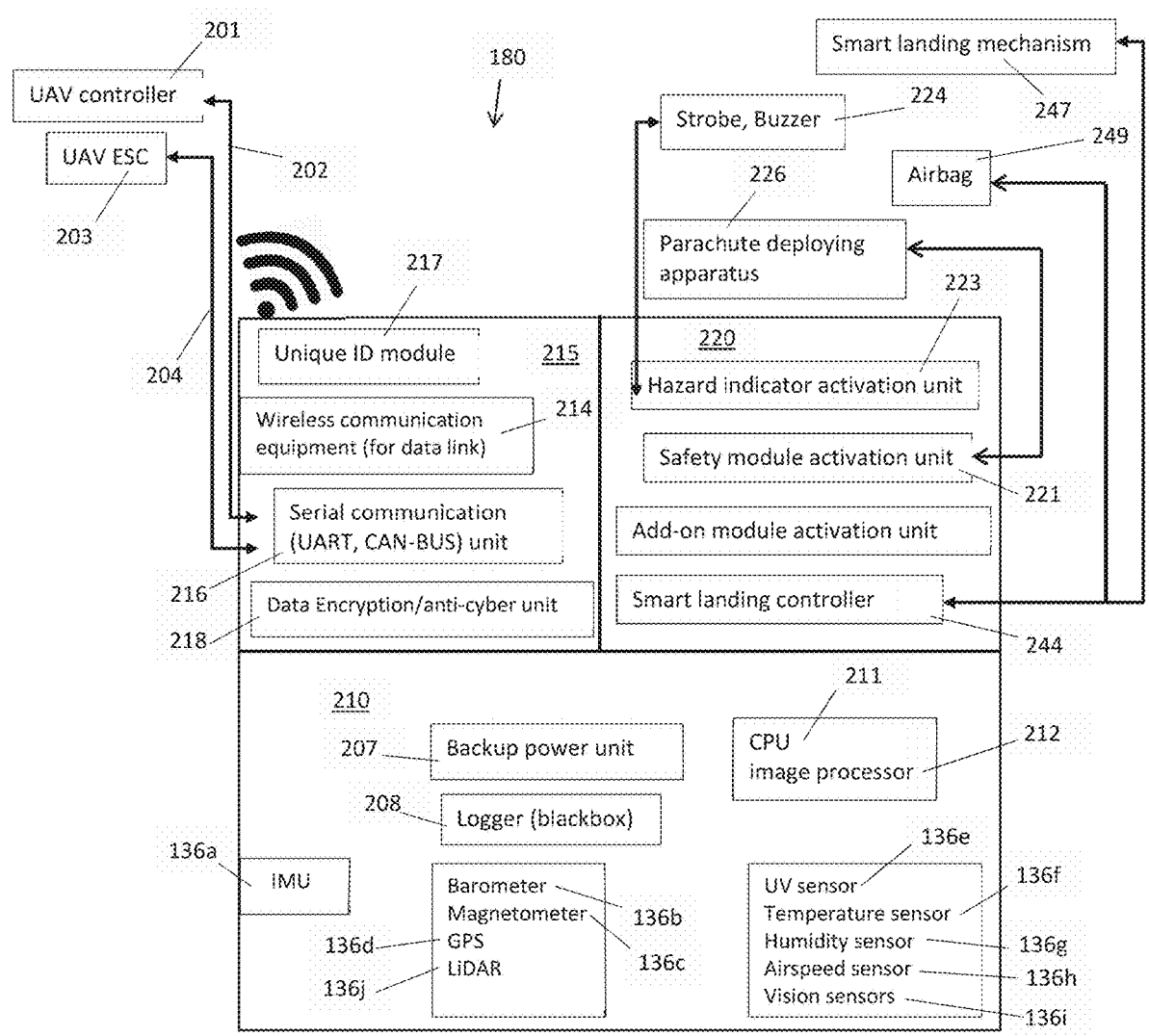
FIG. 16 is a schematic illustration of components of safety apparatus usable in conjunction with the system of FIG. 15.
Figure 20:
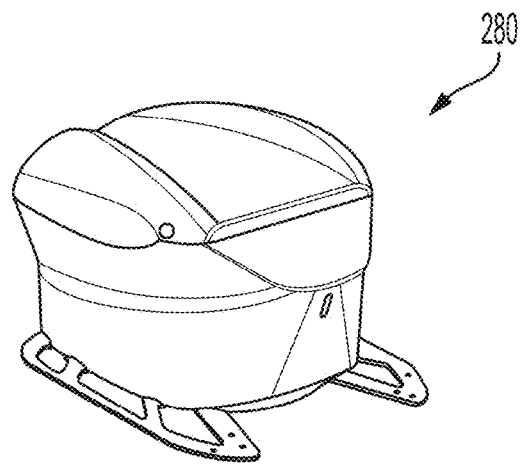
FIG. 20 is a perfective view of another embodiment of safety apparatus.
Figure 21:
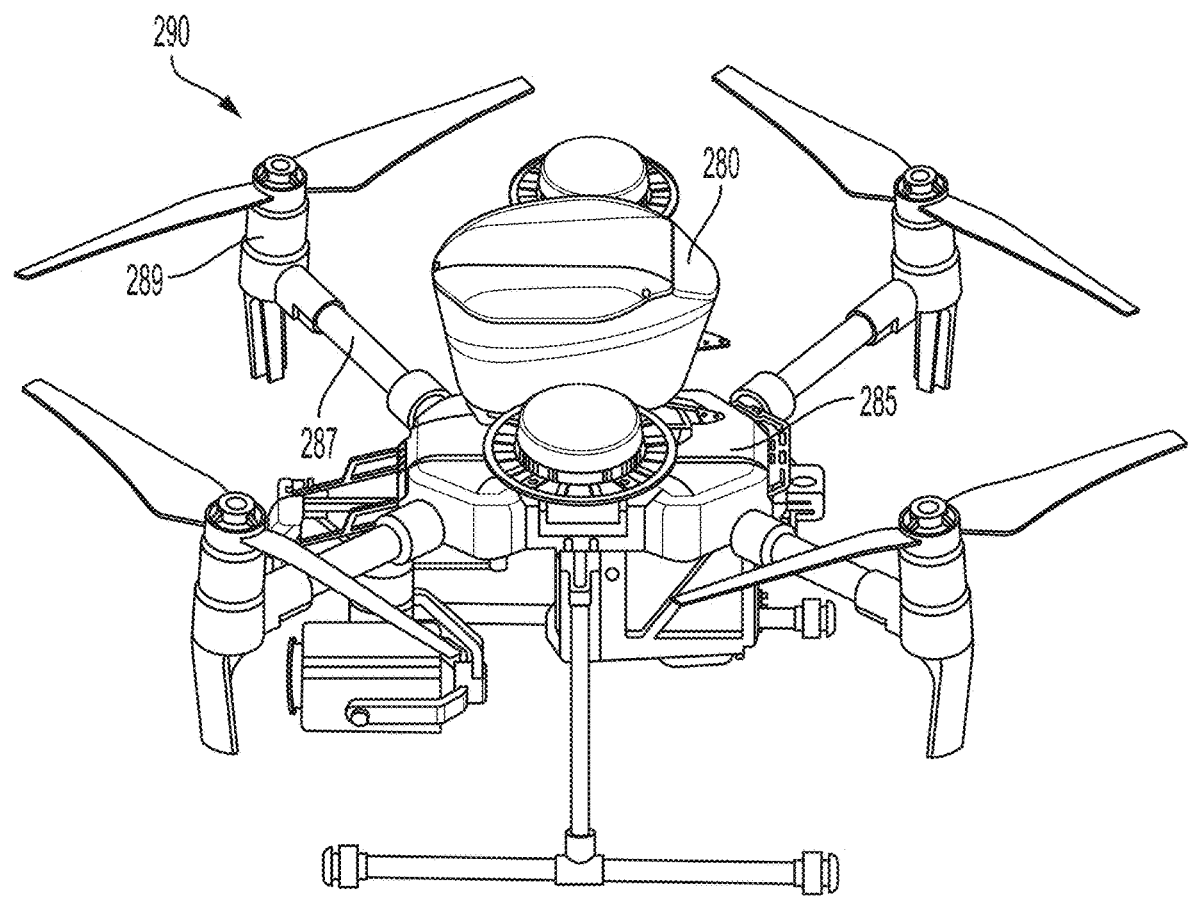
FIG. 21 is a perspective view of a UAV, to a platform of which is secured the safety apparatus of FIG. 20.

FIGS. 20 and 21 illustrate the secured positioning of safety apparatus 280, which may comprise one or more components of safety apparatus 180 of FIG. 16, on top of a region of the platform 285 of UAV 290 which is central to the plurality of rotor arms 287. Each rotor arm 287 carries one or more rotors 289 functioning as a lift generator. The fabric retaining chamber including the hollow portions thereof may be connected to the housing of safety apparatus 280. Alternatively, safety apparatus 280 may be securely positioned to the underside of platform 285. The retained fabric may be unconnected to the housing of safety apparatus 280 or to the body of UAV 290 so as not to limit the distance to which the fabric may be propelled.

Figure 22:
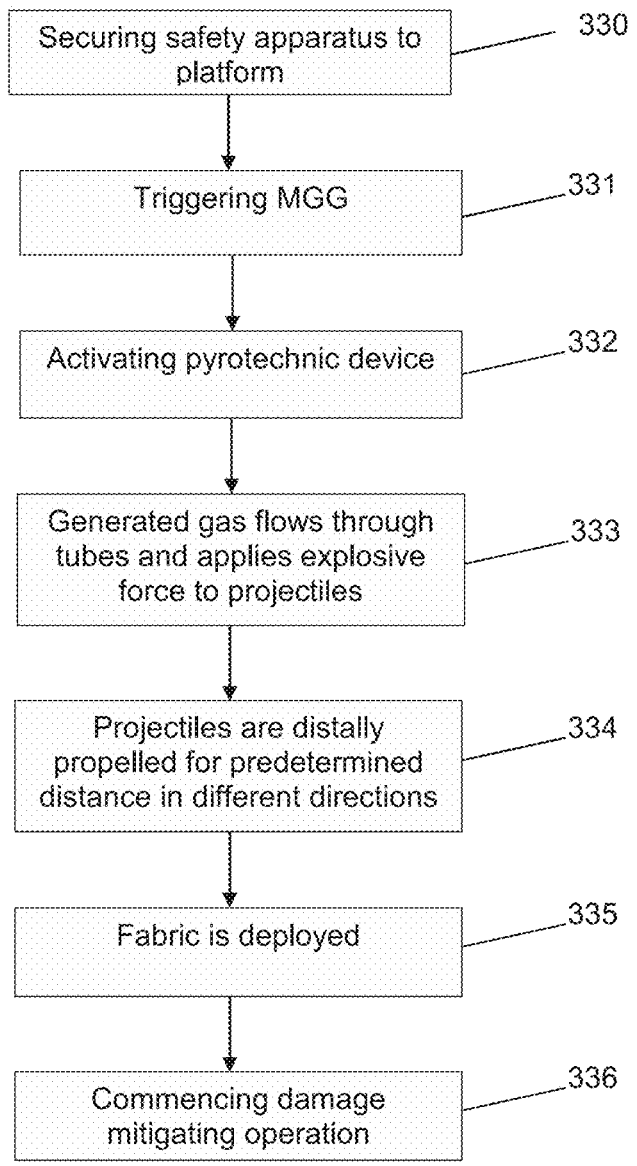
FIG. 22 is a flow chart of a damage mitigating operation.

As shown in FIG. 22, a damage mitigating operation may be performed after the safety apparatus is secured to a platform in step 330, whether a fixed platform or a movable platform. Following triggering the MGG in step 331 by electrical or mechanical means, the pyrotechnic device becomes activated in step 332, causing the constituent components of the propellant to react and to generate energy intensive gas. The generated gas simultaneously flows through each tube extending from the manifold in step 333, applying an explosive force onto a corresponding projectile. The explosive force is converted into momentum, and each projectile is therefore distally propelled in a different direction for a predetermined distance in step 334. This distance is reliably achieved by providing a sufficient dose of combustible material and a sufficient amount of activation current to cause the fabric to be deployed in step 335 by being expanded to a desired dimension. The predetermined distance to which the projectiles are propelled by the explosive force may range from 15-50 m, e.g. 20 m, when the projectiles are ejected upwardly, and may be up to 10 m when the projectiles are ejected downwardly.

While the fabric is fully expanded, the projectiles, whether upwardly ejected projectiles, downwardly ejected projectiles or laterally ejected projectiles, remain attached by the attached peripheral portion of the fabric after having transferring their kinetic energy to the fabric to urge the latter to an expanded condition. Since the projectiles are propelled a significant distance, the expanded fabric is ensured of not becoming entangled with a rotating lift generator, and therefore is no need for deactivating the lift generator. A damage mitigating operation is then commenced in step 336 through the intervention of the expanded fabric.

Figure 23:
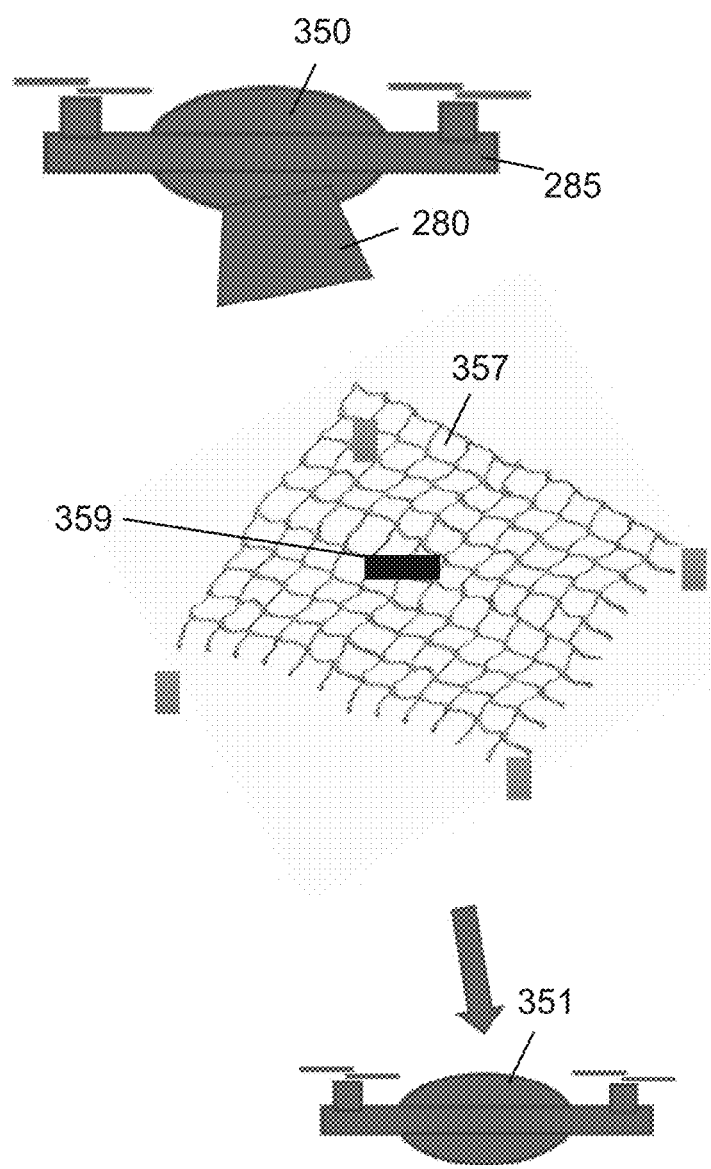
FIG. 23 is a schematic illustration of a damage mitigating operation by which an unwanted UAV is intercepted.

FIG. 23 illustrates an implementation of deploying a net in order to intercept an unwanted UAV 351. When unwanted UAV 351 is discovered, for example when found by an imaging system to be dangerously close to a security facility such as an army base or an airport, safety apparatus 280 of intercepting UAV 350 is activated. Safety apparatus 280 is mounted below the platform 285 of intercepting UAV 350, so that when intercepting UAV 350 is located above unwanted UAV 351 and safety apparatus 280 is activated in response to an autonomously or remotely generated triggering signal net 357 will be downwardly ejected to intercept and entrap unwanted UAV 351. Net 357 may be configured with auxiliary parachute deploying apparatus 359, which is configured to be automatically deployed when net 357 becomes engaged with unwanted UAV 351, such as by means of one or more sensors, to prevent damage to underlying bystanders if the intercepted UAV 351 were to undergo a dangerous free fall. Alternatively, net 357 may remain connected to safety apparatus 280 or to the body of intercepting UAV 350 by a tow line, to facilitate the towing of intercepted UAV 351 to a ground station.

Figure 24:
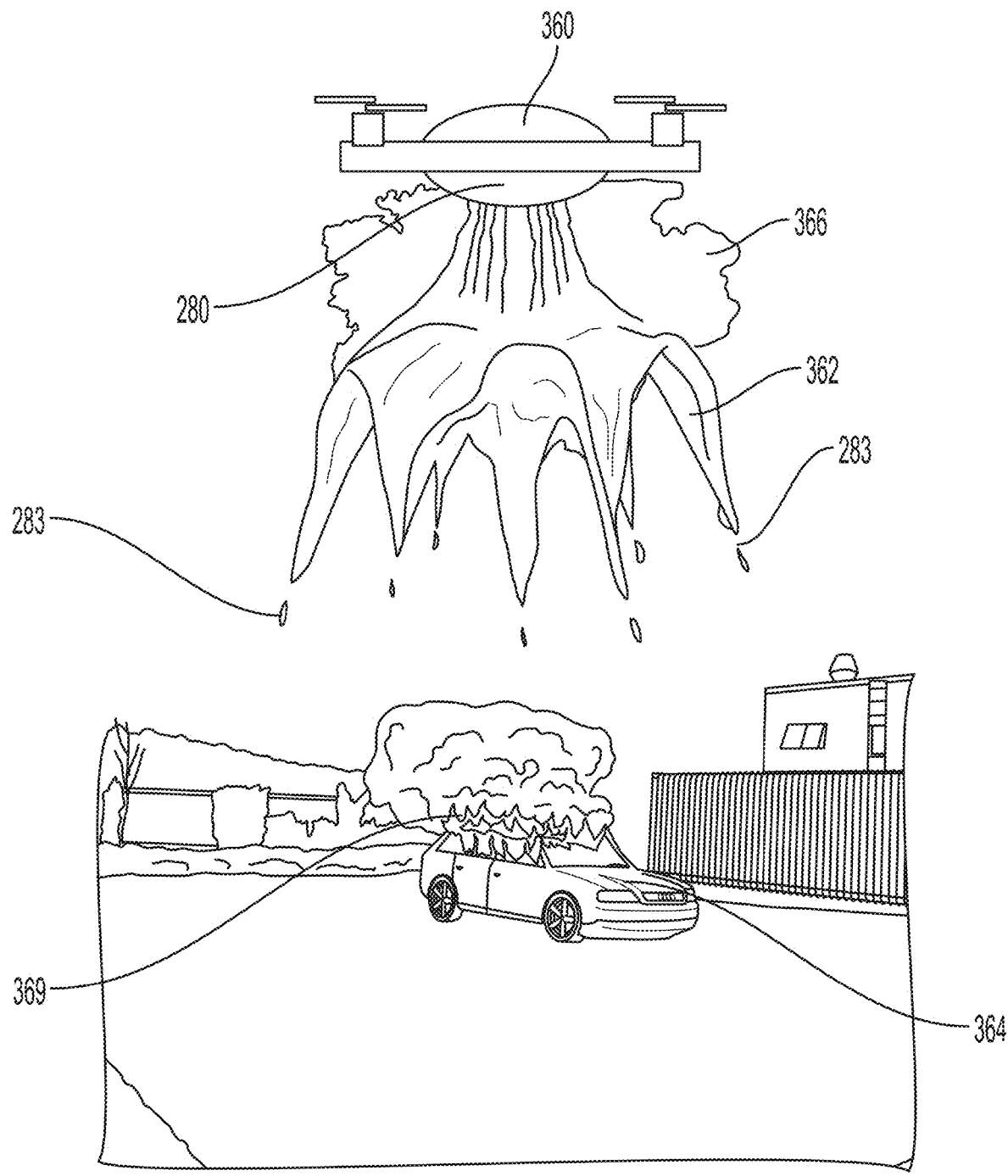
FIG. 24 in an illustration of a damage mitigating operation by which a burning fire is suppressed.
Figure 25:
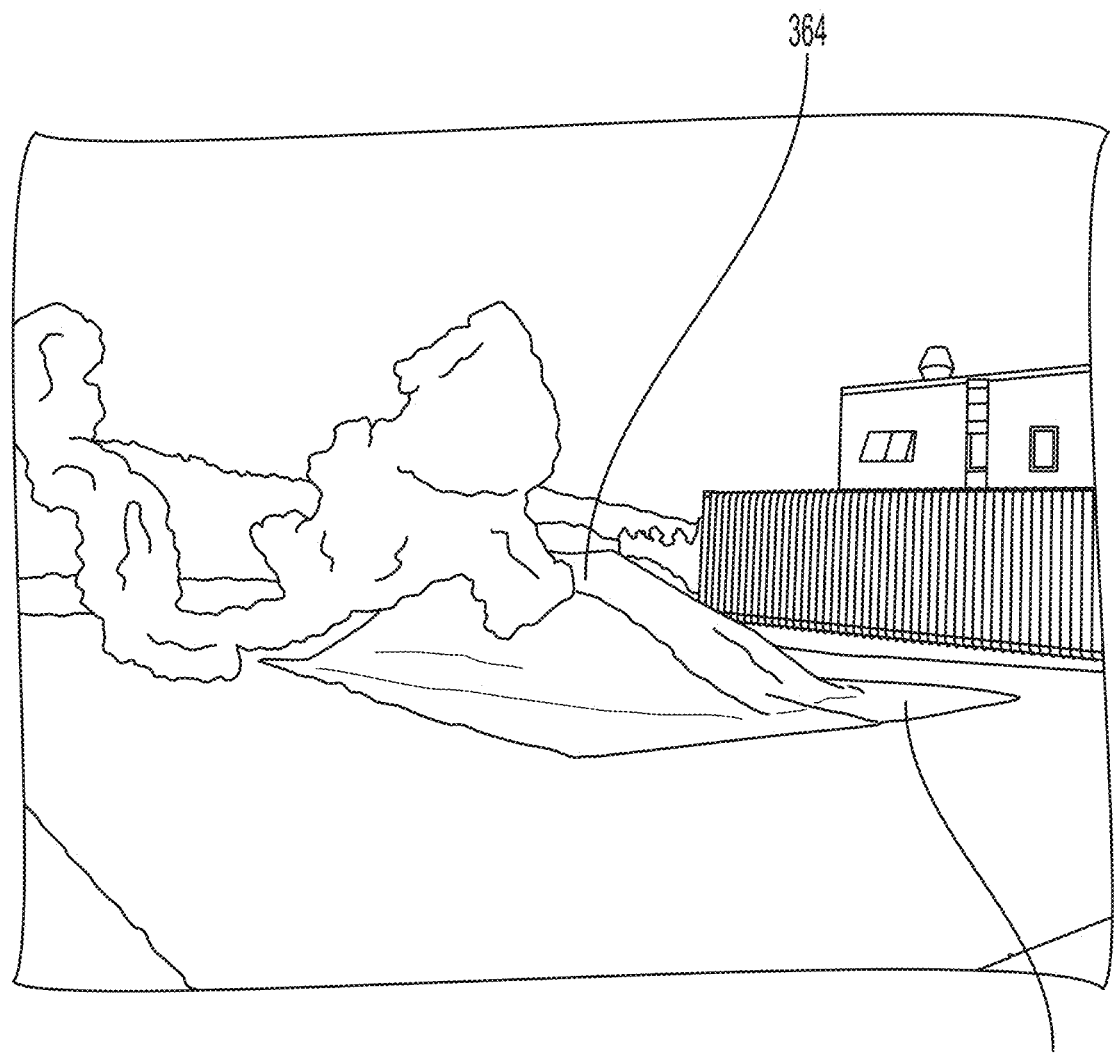
FIG. 25 is an illustration of the positioning of a fire suppressing fabric following the damage mitigating operation of FIG. 24.

FIGS. 24 and 25 illustrate an implementation of deploying fire suppressing fabric 362 for extinguishing a burning motor vehicle 364 by means of downwardly directed safety apparatus 280 mounted on an initiating UAV 360. This arrangement may likewise be used for helping to extinguish a fire of serious ramifications, for example one that is burning within a high-story structure or at a forest.

Fabric 362 is made of an inflammable material which, after being deployed in a spread and expanded condition and having been positioned to cover substantially the entire source of fire, will smother the fire by limiting or altogether excluding the exposure of the fire to oxygen.

Fire suppressing fabric 362 is shown in FIG. 24 after having been ejected downwardly from the safety apparatus by the generated gas 366 while the projectiles 283 gravitationally direct the expanded fabric onto the fire 369 that is burning within motor vehicle 364. The predetermined angular disposition relative to a horizontal plane of the plurality of projectiles 283, defined by the safely apparatus, is dependent upon the weight and size of fabric 362, a larger fabric requires a correspondingly larger angle relative to a horizontal plane, and vice versa for a smaller fabric. Fabric 362 is shown in FIG. 25 to completely cover the motor vehicle 364 while the fire is being smothered.

Figure 26:
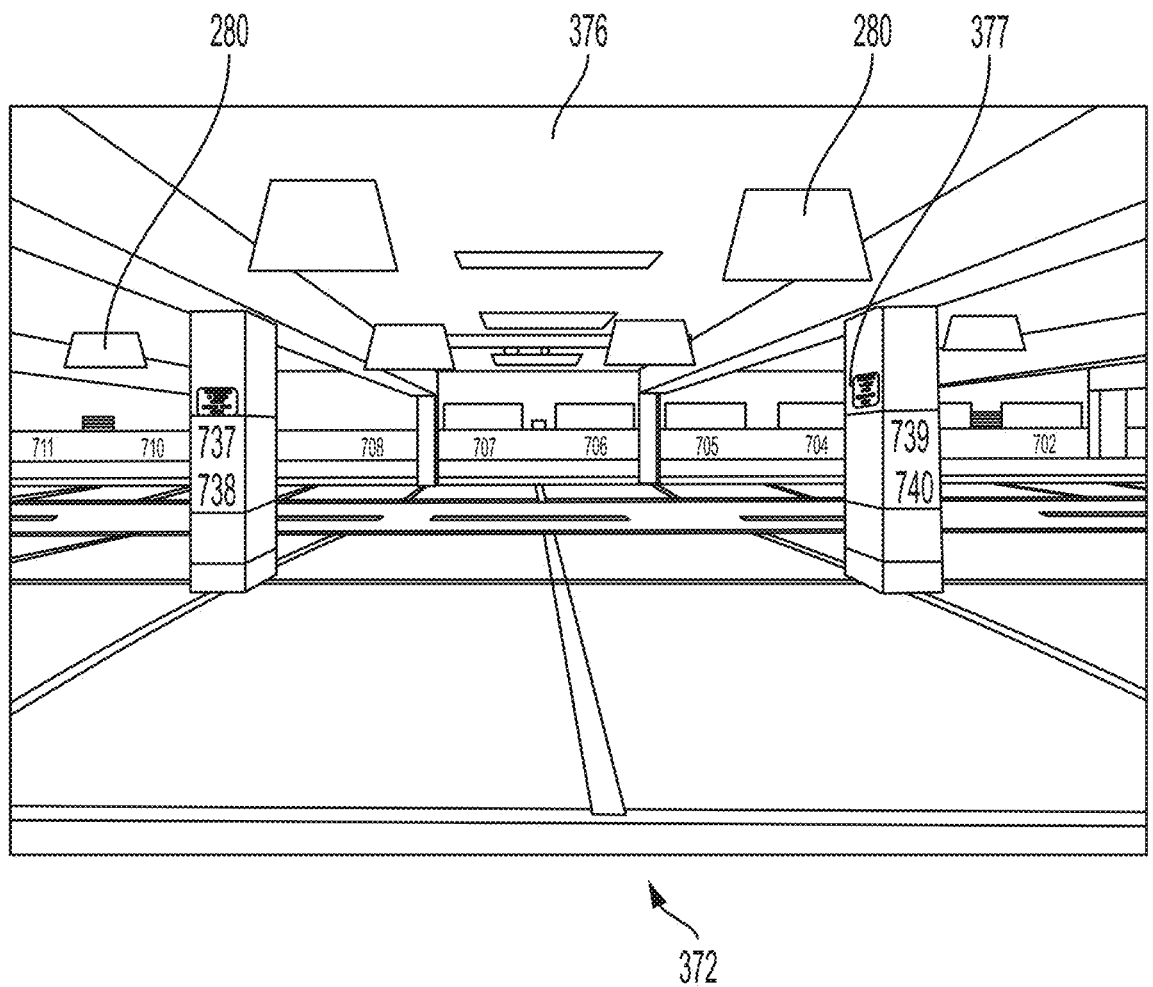
FIG. 26 is a perspective view of an indoor structure within which a plurality of safety apparatus units are mounted to facilitate a fire suppressing operation.

FIG. 26 illustrates an implementation of deploying fire suppressing fabric for extinguishing a fire that is burning within a parking lot 372, or within any other indoor structure, by means of a plurality of downwardly directed safety apparatus units 280 mounted on the ceiling 376 of the parking lot 372. A plurality of heat sensors 377 interspersed within parking lot 372 may be the stimulus of the triggering signal, in order to deploy a fabric located proximately to the source of the detected fire.

The use of fire suppressing fabric is advantageous relative to a sprinkler system or fire extinguishers since the widespread damage caused by discharged water or powder is able to be avoided.

Figure 27:
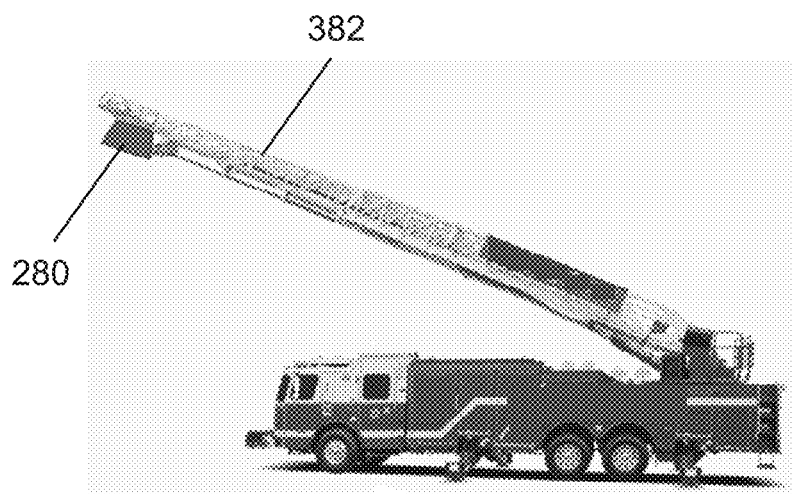
FIG. 27 is a perspective view of a fire truck, at the end of a ladder of which is mounted safety apparatus used for fire suppression.

FIG. 27 illustrates aw implementation of deploying fire suppressing fabric by means of downwardly directed safety apparatus 280 mounted at the end of a fire track ladder 382.

Figure 28:
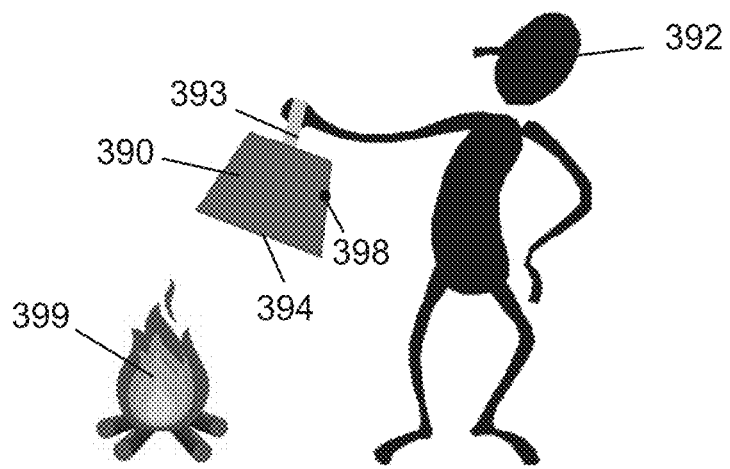
FIG. 28 is a schematic illustration of a fire suppressing operation with the use of hand-held damage mitigating apparatus.

FIG. 28 illustrates an implementation of deploying fire suppressing fabric by means of hand-held safety apparatus 390, which may be configured similarly to safety apparatus 10 of FIGS. 1-4. When user 392 has become aware of fire 399, the handle 393 of apparatus 390 is held such that the distal end 394 of apparatus 390 is facing the fire 399, whether distal end 394 is downwardly directed, upwardly directed or laterally directed. A triggering action is then initiated by depressing a dedicated button 398, or otherwise manipulating a suitable input device, to activate the gas generator. Since the projectiles are designed to be propelled a relatively small distance on the order of up to only a few meters, often less than one meter, the corresponding recoil force experienced by user 392 is of a sufficiently relatively small magnitude to be dissipated by the user's body.

Example 1

The parachute deploying apparatus weighing 450 gm was carried by a multirotor UAV having a weight of 7 kg, a diameter of 1.10 m and a height of 0.5 m. The canopy was made of Nylon 66 ripstop fabric and had a diameter of 1.78 m. Six suspension lines, each having a length of 1.6 m, were connected to the aircraft. Three draw cords, each having a length of 25 cm, were connected to a corresponding projectile configured with an arrow-shaped head.

Three inclined tubes extended from the manifold. A projectile having a weight of 23 gm, and an arrow-shaped head connected to a rod having a length of 6 cm was inserted within a corresponding tube. Flexible polymeric material was applied to the tubes, providing sealing after insertion of the corresponding projectile therewithin.

The single MGG that was threadedly engageable with the manifold was the Autoliv A7Zr2.1, IMI-Type 610258300, manufactured by Autoliv, Ogdon, Utah. The MGG had a diameter of 1.5 cm and a length of 4 cm. The pyrotechnic device produced 8 liters of nitrogen.

The projectiles were propelled a distance of 112.5 cm within a time period of 0.28 seconds after the trigger was initiated.

Example 2

During the flight of a six rotor UAV, a crack developed in one of the rotor blades. The failure detection unit initiated the Flight Abnormality mode, and the UAV was forced to fly to a specified ground station, in order to repair the crack.

An accelerometer operable in the 200 Hz range was employed to acquire vibration amplitude readings. Vibration amplitude of less than 0.5 m/s$^2$ is reflective of normal UAV operation. Vibration amplitude of greater than 0.5 m/s$^2$ is reflective of an anomalous flight condition such as the development of a crack in a rotor blade. Vibration amplitude of greater than 3.0 m/s$^2$ is reflective of a critical failure that requires the immediate termination of flight and the deployment of a parachute.

While some embodiments of the invention have been described by way of illustration it will be apparent that the invention can be carried out with many modifications, variations and adaptations, and with the use of numerous equivalents or alternative solutions that are within the scope of persons skilled in the art, without exceeding the scope of the claims.

The invention claimed is:

1. Damage mitigating apparatus, comprising:
   a) a chamber in which an undeployed damage mitigating fabric is retained;
   b) a manifold positioned within an interior of, and fixed to, said chamber, with said manifold having a longitudinal axis and being releasably coupled to a single vessel within which pressurized gas is generated;
   c) a gas generator which cooperates with said vessel;
   d) a plurality of hollow tubes which extend distally from, and are in fluid communication with, said manifold, such that the plurality of hollow tubes extend in a direction that includes a component parallel to the longitudinal axis of said manifold; and
   e) a plurality of projectiles, each of which is attached to a corresponding portion of said undeployed fabric and formed with a rod that is receivable in a corresponding one of said tubes;
      wherein the pressurized gas which is generated upon triggering of said gas generator is flowable through each of said tubes to propel said plurality of projectiles and to cause said fabric to become deployed; and
      wherein said apparatus is configured to cause said fabric to achieve a desired expanded dimension simultaneously with ejection of said plurality of projectiles from said chamber and to perform a damage mitigating operation.

2. The apparatus according to claim 1, wherein each of the projectiles is propelled a predetermined distance by the pressurized gas.

3. The apparatus according to claim 1, wherein the fabric is fully deployable within less than a second following a gas generator triggering event.

4. The apparatus according to claim 1, wherein each of the projectiles is sealingly engageable with a corresponding tube.

5. The apparatus according to claim 1, wherein the vessel contains a solid propellant consisting of materials that normally do not chemically react with each other and a pyrotechnic device for initiating a reaction with said propellant.

6. The apparatus according to claim 1, wherein the generated pressurized gas is dischargeable from an aperture formed in the vessel to an interior of the manifold and is flowable from said manifold interior through of each of the tubes simultaneously.

7. The apparatus according to claim 1, wherein the vessel contains a compressed or liquid gas and the gas generator is a spring loaded puncturing mechanism for generating pressurized gas upon puncturing the vessel.

8. A damage mitigating apparatus, comprising:
   a) a chamber in which an undeployed damage mitigating fabric is retained and secured to a platform;
   b) a manifold positioned within an interior of, and fixed to, said chamber, with said manifold being releasably coupled to a single vessel within which pressurized gas is generated;
   c) a gas generator which cooperates with said vessel;
   d) a plurality of hollow tubes which extend distally from, and are in fluid communication with, said manifold; and
   e) a plurality of projectiles, each of which is attached to a corresponding portion of said undeployed fabric and termed with a rod that is receivable in a corresponding one of said tubes;
      wherein the pressurized gas which is generated upon triggering of said gas generator is flowable through each of said tubes to propel said plurality of projectiles and to cause said fabric to become deployed,
      wherein said apparatus is configured to cause said fabric to achieve a desired expanded dimension simultaneously with ejection of said plurality of projectiles from said chamber and to perform a damage mitigating operation; and
      wherein the chamber has a discontinuous exterior wall configured with a plurality of hollow portions, each of said hollow portions extending inwardly from said exterior wall into the chamber interior, spaced from the manifold and having a hollow portion interior within which a corresponding hollow tube extending from the manifold and receiving one of the projectile rods is positioned.

9. The apparatus according to claim 8, wherein a group of folded portions of the fabric is retained within the chamber between two adjacent hollow portions, such that a first folded portion is separated without contact from a second folded portion adjacent to the folded portion, with the exception of an expandable crease between the first and second folded portions, to facilitate interference-free ejection of each of said folded portions from the chamber with respect to another one of said folded portions as well as simultaneous fabric ejection and deployment.

10. The apparatus according to claim 1, wherein the chamber is secured to a platform of an initiating aerial vehicle.

11. The apparatus according to claim 10, wherein the fabric is a parachute.

12. The apparatus according to claim 10, wherein the fabric is a net configured to intercept a malicious aerial vehicle.

13. The apparatus according to claim 10, wherein the fabric is a fire suppressing fabric.

14. The apparatus according to claim 1, wherein the chamber to secured is a platform of an indoor structure and the fabric is a fire suppressing fabric configured to smother a fire present within the indoor structure.

15. The apparatus according to claim 1, wherein the chamber is a hand-held chamber and comprises an input device which, when manipulated, is configured to trigger the gas generator, wherein the fabric is a fire suppressing fabric configured to smother a fire.

16. Fire extinguishing apparatus, comprising:
   a) a chamber in which an undeployed fire suppressing fabric in a folded condition is stored;
   b) a manifold positioned within an interior of, and fixed to, the chamber, with said manifold being releasably coupled to a single vessel within which pressurized gas is generated;
   c) a gas generator which cooperates with said vessel;
   d) a plurality of hollow tubes which extend distally from, and are in fluid communication with, said manifold;
   e) a plurality of projectiles, each of which is formed with a rod that is receivable in a corresponding one of said tubes and is attached to a corresponding portion of said undeployed fire suppressing fabric; and f) a manually manipulatable input device provided with said chamber which, when manually manipulated, is configured to trigger the gas generator and to cause the fire suppressing fabric to be propelled by a generated pressurized gas for a predetermined distance to achieve a desired expanded dimension that facilitates smothering of a fire.

17. The apparatus according to claim 16, wherein the chamber is a hand-held chamber having a proximal end and a distal end which is repositionable until the distal end is facing the fire, wherein each of the projectiles is configured to generate a corresponding recoil force experienced by a user that is of a sufficiently small magnitude to be dissipated by the user's body.

18. The apparatus according to claim 16, wherein the chamber is mounted at an end of a fire truck ladder and the input device is manipulatable by a fireman standing on the ladder.

19. The apparatus according to claim 16, wherein a cord is connected to each of the projectiles and also to a corresponding portion of the undeployed fire suppressing fabric.

\* \* \* \* \*